United States Patent [19]
De Bonet et al.

[11] Patent Number: 6,075,545
[45] Date of Patent: Jun. 13, 2000

[54] METHODS AND APPARATUS FOR STORING, ACCESSING AND PROCESSING IMAGES THROUGH THE USE OF ROW AND COLUMN POINTERS

[75] Inventors: Jeremy S. De Bonet, Cambridge, Mass.; Richard Szeliski, Bellevue, Wash.

[73] Assignee: Microsoft Corporation, Redmond, Wash.

[21] Appl. No.: 08/960,510

[22] Filed: Oct. 29, 1997

[51] Int. Cl.[7] .................................................... G06F 12/06
[52] U.S. Cl. ........................................... 345/517; 345/507
[58] Field of Search ................................. 345/501–503, 345/520, 521, 507, 509, 515, 516, 517, 203

[56] References Cited

U.S. PATENT DOCUMENTS

| | | | |
|---|---|---|---|
| 5,341,472 | 8/1994 | Leak | 345/523 |
| 5,371,519 | 12/1994 | Fisher | 345/203 |
| 5,585,863 | 12/1996 | Hackett et al. | 348/716 |
| 5,638,467 | 6/1997 | Chua et al. | 382/298 |
| 5,838,334 | 11/1998 | Dye | 345/503 |
| 5,877,741 | 3/1999 | Chee et al. | 345/113 |
| 5,883,633 | 3/1999 | Gill et al. | 345/431 |

OTHER PUBLICATIONS

"IUE Environment Image Understanding", http://www.aai.com/AAI/IUE/ (pp. 1–73); printed Oct. 28, 1997; last updated Apr. 23, 1997.
"Center for Innovative Computer Applications" http://www.cica.indiana.edu/graphics/image.formats.html (pp. 1–22), printed Sep. 19, 1996, last updated Nov. 21, 1994.
"Graphic/Image File Formats" http://fas.sfu.ca/cs/undergrad/CourseMa . . . terial/notes/Chap3/Chap3.2/Chap3.2.html (pages 1–5), printed Sep. 19, 1996, last updated Jan. 22, 1996.
Leonard G. C. Hamey, "A User's Guide to the Generalized Image Library" Computer Science Dept., Carnegie–Mellon University, Pittsburgh, PA 15213, Revised Aug. 9, 1990 pp. 1–29.
Leonard Hamey, Harry Printz, Doug Reece, Ralph Hyre, Steve Shafer, "A Programmer's Guide to the Generalized Image Library" Computer Science Dept., Carnegie–Mellon University, Pittsburgh, PA 15213, Revised Aug. 9, 1990 pp. 1–104.

*Primary Examiner*—Ulka J. Chauhan
*Attorney, Agent, or Firm*—Michaelson & Wallace; Peter L. Michaelson

[57] ABSTRACT

Methods and apparatus for storing, accessing, and processing information representing images through the use of row and column pointers are described. By manipulating and/or generating new sets of row and column pointers, many image processing operations can be performed without the need to access or copy the original image data. Padding, enlargement and reduction operations are examples of image processing operations that can be performed virtually. A logical image is created as the result of a virtual image processing operation. In order to permit the fast and efficient access of the image data which represents the logical image, the logical image is divided into safe and unsafe logical image regions. In a safe logical image region, data representing the image is regularly spaced in memory and may be accessed using a first relatively fast and efficient memory access technique. In unsafe logical image regions, the data representing the logical image is not regularly spaced in memory and is accessed using a second memory access technique that uses both the row and column pointers associated with the unsafe image region. The methods and apparatus of the present invention allow many image processing operations to be performed using less memory and/or by performing fewer computations than conventional image processing techniques.

21 Claims, 19 Drawing Sheets

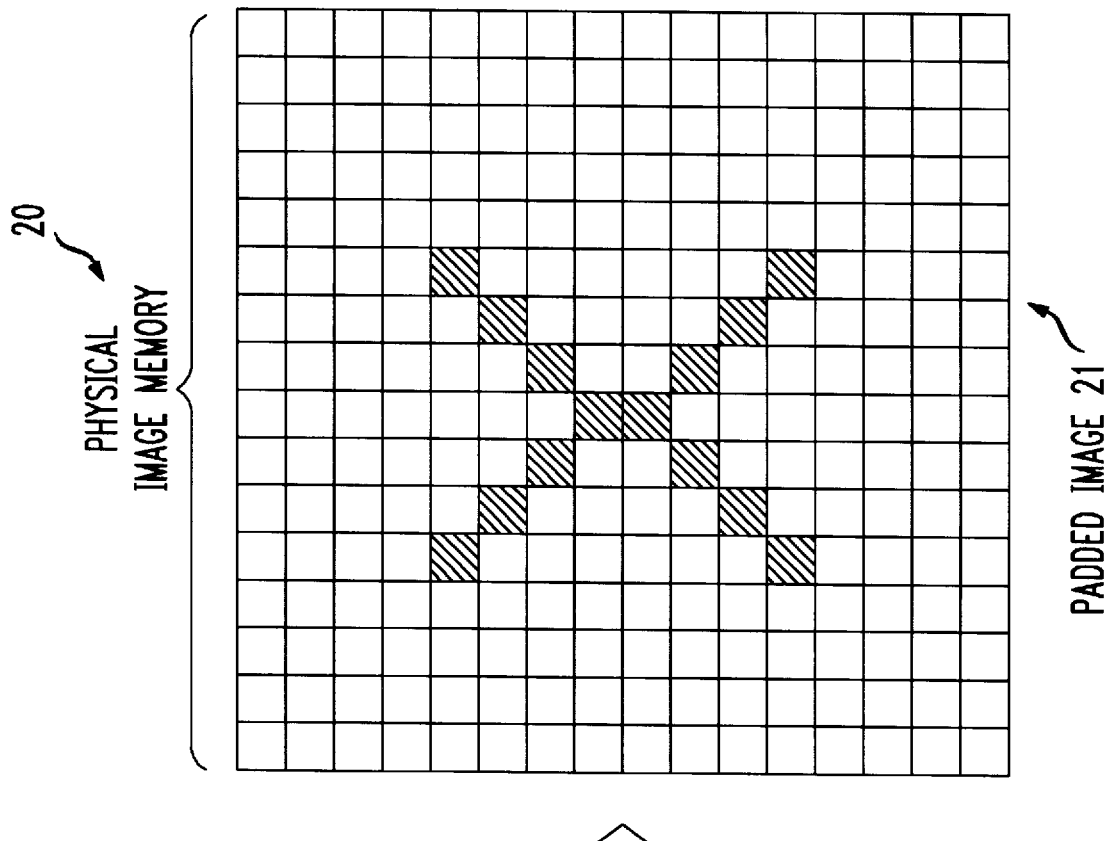
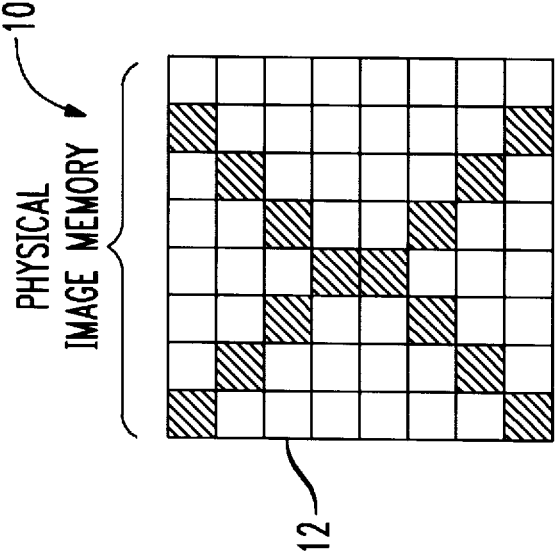
FIG. 2
(PRIOR ART)

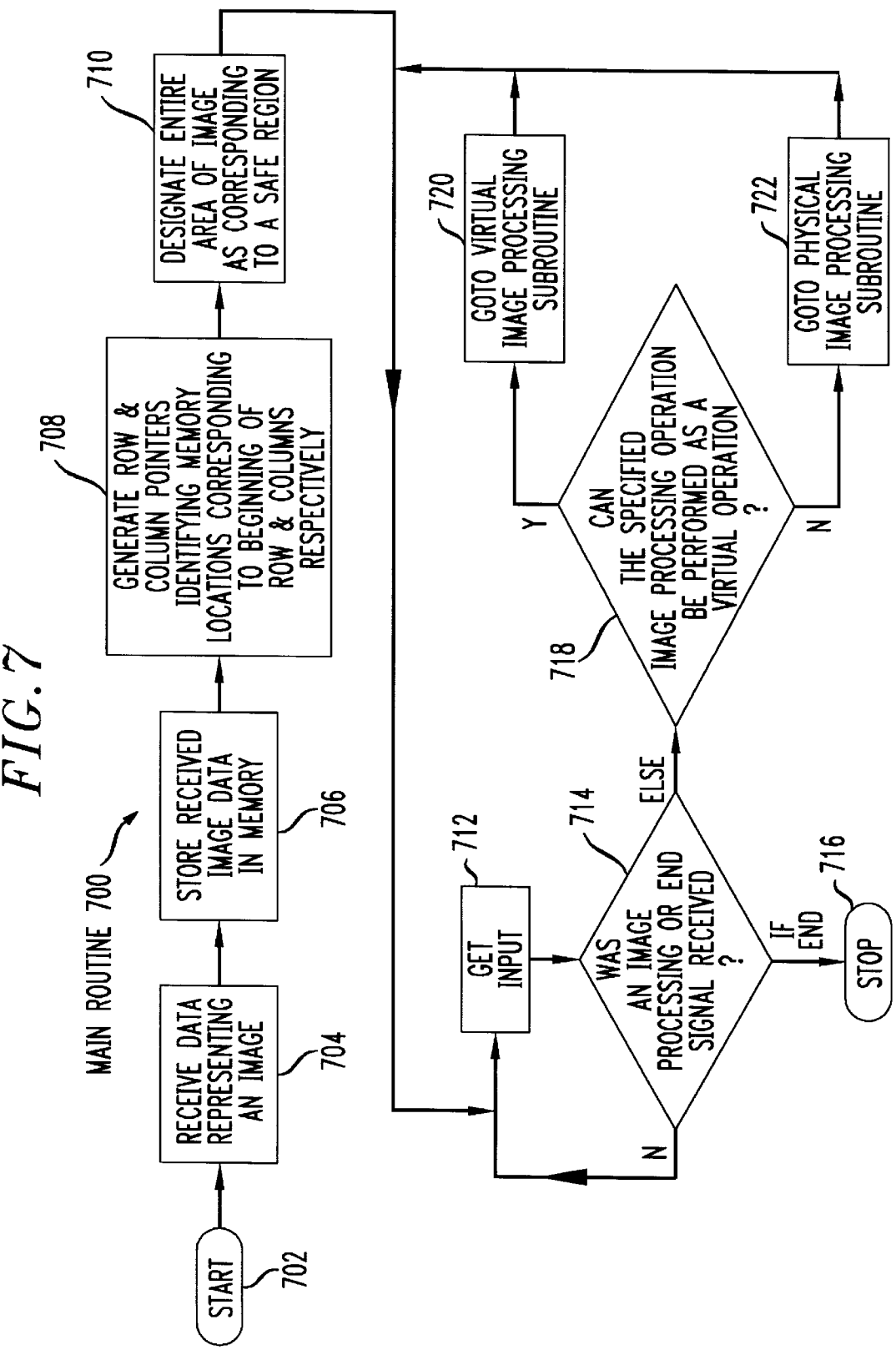

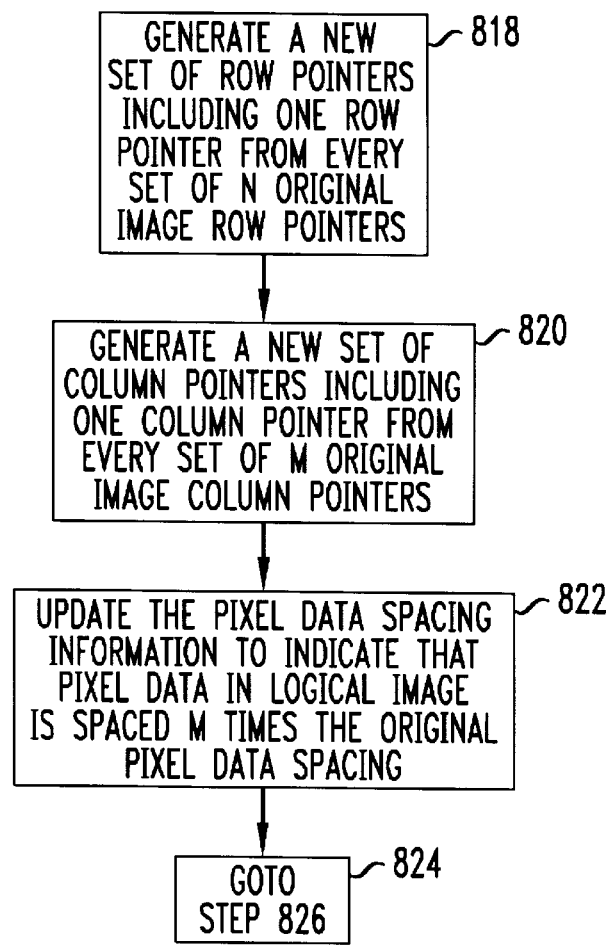
FIG. 8B
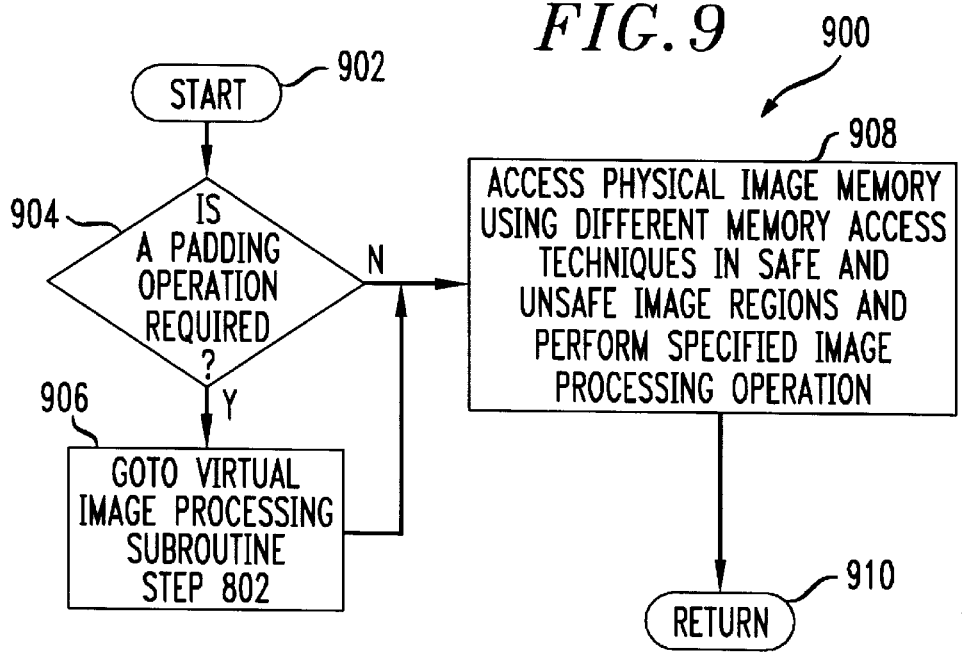

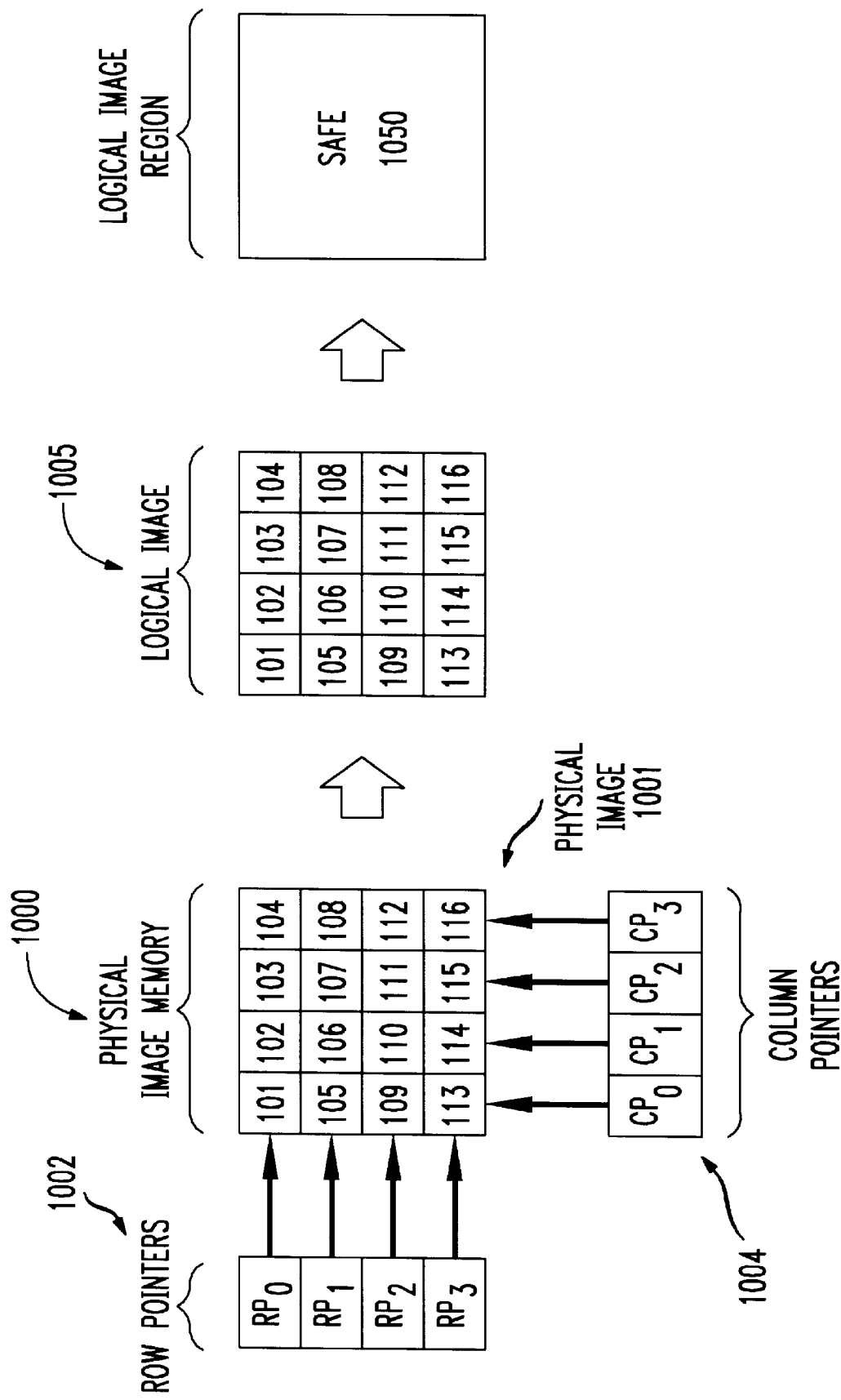

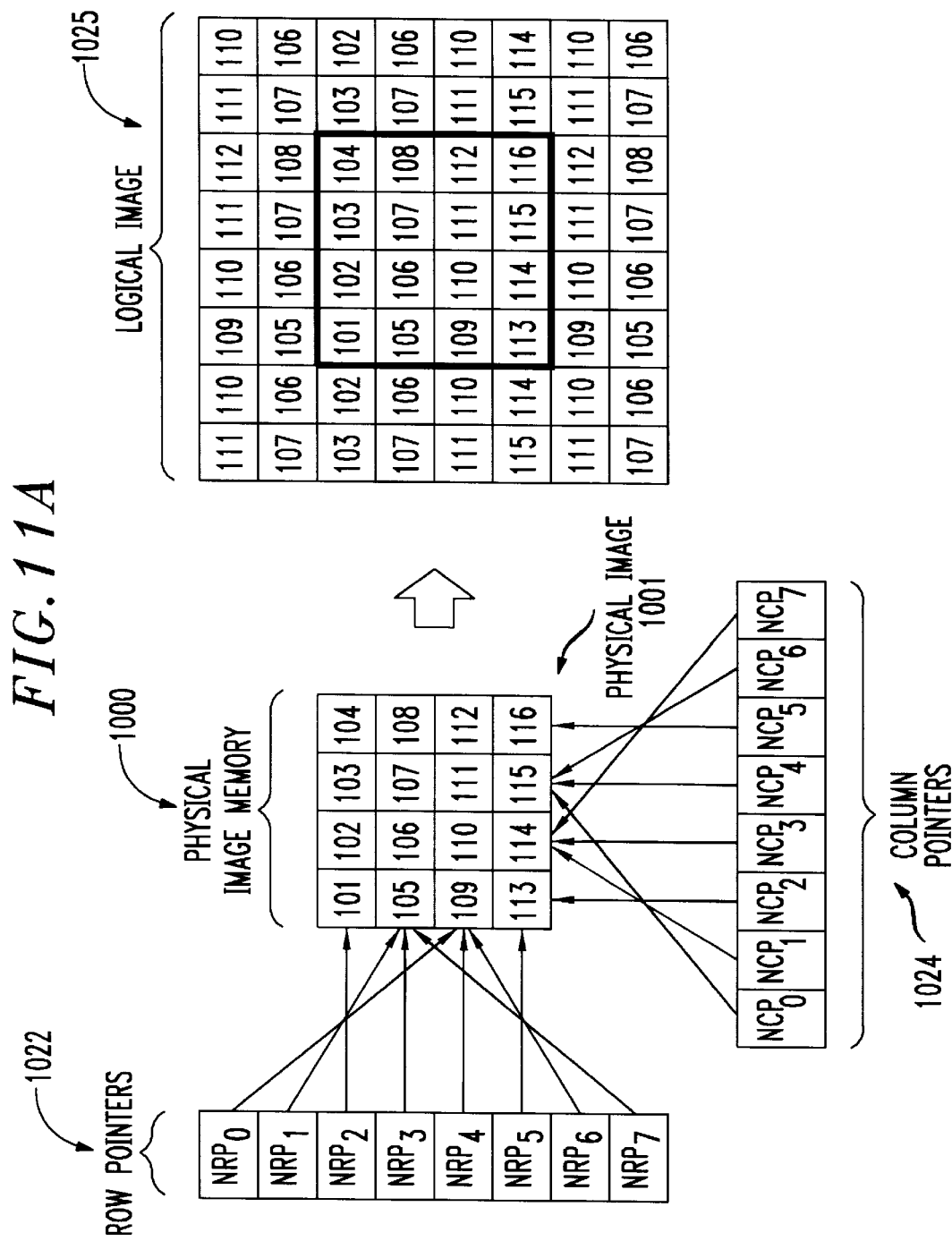

FIG. 14B

LOGICAL IMAGE — 1426

| C | C | C | C | C | C | C | C |
|---|---|---|---|---|---|---|---|
| C | C | C | C | C | C | C | C |
| C | C | 101 | 102 | 103 | 104 | C | C |
| C | C | 105 | 106 | 107 | 108 | C | C |
| C | C | 109 | 110 | 111 | 112 | C | C |
| C | C | 113 | 114 | 115 | 116 | C | C |
| C | C | C | C | C | C | C | C |
| C | C | C | C | C | C | C | C |

| 0 | 1 | 0 |
|---|---|---|
| 1 | 0 | 1 |
| 0 | 1 | 0 |

METHODS AND APPARATUS FOR STORING, ACCESSING AND PROCESSING IMAGES THROUGH THE USE OF ROW AND COLUMN POINTERS

FIELD OF THE INVENTION

The present invention is directed to image processing and, more particularly, to methods and apparatus for efficiently storing, accessing, and processing information representing an image.

BACKGROUND OF THE INVENTION

Using digital data to represent images, e.g., for computer applications, has become commonplace. Each image usually comprises pixels arranged in horizontal and vertical rows. Each pixel of an image is normally represented by one or more bits of data, e.g., one byte per pixel. The set of data, e.g., rows and columns of pixel data, which represent an image, is frequently referred to as a bitmap. Thus, images represented and stored in a computer's memory as bitmaps are frequently referred to as bitmap images.

In many computer systems, each image is stored as an independent data set or object which can be accessed and processed independently from data representing other images.

Various known systems store and access the data representing a bitmap image in memory in different ways. Some known systems store the data representing an image in regularly spaced memory locations with a fixed amount of spacing, e.g., one byte, being allocated for the data representing each pixel of an image in memory. In most cases, the distance between memory locations is determined by the amount of data used to represent each pixel. This approach results in a regularly spaced image memory region as opposed to an irregularly spaced image memory region which results when pixel data is spaced at irregular or non-uniform distances within memory.

FIG. 1A illustrates an 8×8 grid 12 which represents a block of physical image memory 10. Each of the 64 locations within the grid 12 corresponds to a segment, e.g., byte of memory, in which the data representing a single pixel of an image 11 is stored. Thus, each block of the grid 12 represents a segment of memory where data representing a pixel is stored. Shading in the blocks of FIG. 1 and the other Figures of the present application, is used to illustrate the pixel stored in the memory segment. Thus, the 64 pixel image 11 is illustrated by the cumulative effect of the shading of the 64 blocks of the grid 12. These 64 blocks represent 14 black and 50 white pixels.

In accordance with one known approach for storing data representing an image in regularly spaced image memory regions, the data representing the pixels of the image 11 are loaded into consecutive memory locations within a computer's memory space with the data representing the pixels of each row being entered in sequence. Since there is a fixed amount of data, e.g., one byte is used to represent each pixel, adjacent columns of pixel data will be separated from each other in memory by the amount of data used to represent individual pixels, e.g., one byte. In addition, since there will be a preselected known number of pixels per row for any given image, it is possible to determine the number of memory locations that will separate the beginning of each row of pixels in memory. Accordingly, entry of the image data into memory in the above described manner results in a regularly spaced image memory 10 where there is a fixed predictable relationship between the location of pixels within an image, e.g., as specified by image row and column number, and the location within a block of physical image memory 10 where the data representing each of the individual pixels is stored.

When processing an image, it is often necessary to perform a memory access operation to obtain the data representing each pixel of an image. This generally results in a very high number of memory access operations being performed to process each and every image. For example, to process a 640×480 image 307,200 memory access operations may be required. For higher resolution images the number of memory access operations required will be even greater.

Typically, image processing algorithms can be optimized, e.g., in terms of the amount of time required to access memory, when operating on regularly spaced memory regions. However, when operating on irregularly spaced and regions, many known image memory access optimizations will not work. This has led to three general approaches for dealing with the problem of storing and accessing images in memory.

The first of the known approaches uses a slow general purpose pixel access technique which can be used to access both regularly and irregularly spaced image memory. While this approach allows for flexibility in terms of how image data is stored, it does so at the expense of computational efficiency in terms of the number and/or complexity of calculations that must be performed to access image memory locations.

A second known approach uses relatively efficient memory access methods over regularly spaced image memory regions and then the use of special case code to handle memory accesses in irregular image memory regions. Special case code may also be used to perform image processing operations at border regions where neighboring pixel data is not readily available. This approach allows for flexibility in terms of image memory access and image manipulation but it does so at the expense of additional development time in terms of the time required to develop routines for handling irregular memory regions and/or for supporting image border processing operations.

The third known approach to storing and accessing data representing images in memory involves the use of relatively efficient memory access methods over regularly spaced memory regions and disallows irregular memory regions. The third known approach also disallows image processing operations in border regions which require neighboring pixel data.

One known method for efficiently accessing regularly spaced image memory regions is illustrated in FIG. 1B. This method maintains a set of row pointers 20. Each set of row pointers 20 includes one row pointer for each row of pixels in an image 24. Each row pointer points to a beginning physical memory location where the data representing the first pixel of the corresponding row of pixels is stored. When performing an image processing operation, the data representing the pixels of any desired row can be readily accessed by using the physical address obtained using the row pointer and adding an increment thereto to arrive at the desired column.

As discussed briefly above, the processing of images is complicated not only by the large number of memory access operations required to process an image using the known techniques, but also by the need for many image processing operations to use neighboring pixel data as part of the processing operation.

In order to support image processing operations which require the use of neighboring pixel data to be performed in border regions of images, many systems require that padding type operations be performed. Often, this involves copying the entire original image into a new, larger space in memory where the regions surrounding the copy of the original image are padded with valid pixel values. This effectively eliminates the border of the original image. Such a padding operation is illustrated in FIG. 2 wherein the image 11 is copied from the original physical image memory 10 into the larger physical image memory 20. As can be seen in FIG. 2, the new physical image 21, created by the copy and pad operation represented by the arrow 22, includes the original image 11 surrounded by white pixels provided by the padding operation.

Unfortunately, such physical copy and pad operations require a relatively large amount of computational resources to access the original image memory locations and copy the image data. In addition, significant amounts of memory are required to store the padded image 21.

Known techniques for image processing also require relatively large amounts of processing resources and physical memory to perform such simple image processing operations as enlarging and reducing an image.

Referring now to FIG. 3, consider the case of enlarging the image 11 using a known image processing technique. The image processing technique represented by the arrow 32 involves generating a new enlarged image 31 from the original image 11 by substituting multiple pixels for each of the original pixels. In FIG. 3 it can be seen that the enlarging process illustrated by the arrow 32 requires a physical image memory that is NxN times the size of original image space, where N represents the degree of enlargement in the horizontal and vertical directions.

Accordingly, enlarging an image using the known image processing technique is both computationally and memory intensive.

While known techniques for reducing an image, e.g., by downsampling in the horizontal and vertical directions by a factor of N as represented by the arrow 42 in FIG. 4, is less memory intensive than an enlargement operation, it still requires a fair number of computations to be performed. Furthermore, additional physical image memory 40 must be provided for storing the reduced image 41 created by the reduction operation if the original image is to be preserved.

It should be noted that with the vast majority of the prior art image processing techniques which produce a new image from an original image it is necessary to maintain the original image in a distinct portion of physical memory if it is to be used again for further image processing operations. Accordingly, when applying the known image processing techniques, physical memory is frequently required to represent both the original image and the new image created as a result of an image processing operation.

Because of the large amount of memory required to represent images in digital form, the amount of memory required to store and process images remains an important consideration for most image processing applications. Furthermore, the number of computations required to perform an image processing operation and the time required to perform those computations is also important for many applications. This is frequently the case in products involving real time image processing applications and/or cost sensitive consumer products such as video games.

Accordingly, there is a need for improved methods and apparatus for storing, accessing, and processing data representing images which use less memory and/or computational resources than the known techniques. In particular, it is desirable that such methods and apparatus provide a sufficient degree of flexibility to allow a wide range of image processing operations to be performed while being relatively efficient in how they access memory. It is also desirable that the improved methods be capable of performing various routine image processing operations without the need for large amounts of physical memory, e.g., such as the memory frequently used to represent an enlarged image or to support a padding operation.

SUMMARY OF THE PRESENT INVENTION

The present invention is directed to methods and apparatus for efficiently storing, accessing, and processing information representing images.

In accordance with the present invention data representing an image formed from rows and columns of pixels is stored in a physical memory device in a sequential uniform manner. This results in the data representing each pixel of the image being spaced a fixed predictable distance from the data representing adjacent pixels. Because the stored image has a fixed number of pixels per row, the distance in terms of memory locations between rows of stored pixel data will also be predictable.

To facilitate memory access and virtual image processing operations a set of row and column pointers is generated and associated with the stored image. Each row pointer indicates, e.g., where the data representing the first pixel in a corresponding row of pixels is stored. The column pointers are, e.g., offset values which indicate the offset that must be added to a row pointer to arrive at a memory location which corresponds to the particular column pointed to by the column pointer.

In accordance with the present invention many image processing operations are performed virtually, e.g., by manipulation and/or generation of row and column pointers. In this manner, the need to perform numerous memory access operations normally associated with performing an image processing operation can be avoided. This frequently results in a reduced number of computations and memory access operations being required to perform an image processing operation as compared to the known systems. In addition, by performing image processing operations virtually, the need to provide memory for storing copies of image data can be reduced or eliminated in many cases.

Examples of image processing operations that can be performed virtually, by manipulating row and column pointers and/or creating new sets of row and column pointers to represent a virtual image, include, e.g., image padding, enlargement and reduction operations.

Even when an image processing operation requires that data representing an image be accessed and used as part of the image processing operation, e.g., a convolution operation, the virtual image processing techniques of the present invention can facilitate such image processing by performing one or more portions of the operation virtually. For example when performing a convolution operation, the image may first be padded virtually. After the virtual padding operation, all the pixels of the original image will have neighboring pixel data which can then be used to complete the convolution operation.

In accordance with the present invention, performing a virtual image processing operation results in a logical image being produced so that memory access operations can be performed in a fast and efficient manner when logical images are being processed, logical images are divided into logical regions for memory access. The present invention provides for two types of logical image regions, i.e., safe regions where image data is regularly spaced in memory and unsafe regions where image data is not regularly spaced in memory.

In accordance with the present invention, after a logical image is created, e.g., through the generation of a set of row and column pointers, it is determined which portions of the logical image thus created correspond to safe logical image regions and which areas correspond to unsafe logical image regions. This information is stored in memory. When subsequently accessing the physical memory to obtain the pixel data corresponding to the logical image, the stored safe/unsafe logical image region information is used to determine the appropriate memory access technique.

In the safe region of memory, relatively efficient memory access techniques are used. For example, when sequentially accessing data representing a row of pixels, a row pointer may be used to access the data representing the first pixel of the row and then the row pointer value is incremented by a fixed amount to access data representing each subsequent pixel in the row. However, in the unsafe memory regions, less efficient memory access techniques are used. In some embodiments, the memory access techniques used to access unsafe image region data involve the use of row and column pointer information to access the pixel data corresponding to each and every pixel.

Frequently, the unsafe logical image regions are usually relatively small compared to the safe logical image regions. Accordingly, for most image processing applications memory access is performed in a manner that, overall, is relatively efficient.

Because virtual image processing may be achieved by generating new sets of row and column pointers, as opposed to altering the original set of stored image data, the present invention permits an image to be processed virtually, without altering the original image. Accordingly, the need to copy an image before performing an image processing operation thereon, e.g., to preserve the original image for use in future image processing operations is eliminated in many cases.

As is apparent from the above discussion, the methods of the present invention offer many advantages in terms of the relatively low number of computations that must be performed and the relatively small amount of memory that must be used to perform many image processing operations. Accordingly, the present invention is particularly useful where processing time and/or the cost of implementing an apparatus to perform image processing operations are an issue. Real time image processing operations are one example of image processing operations to which the present invention is particularly well suited.

The apparatus of the present invention includes a processor, a memory device and various input output devices. The memory device includes multiple memory locations which can be used for storing image data, image processing applications including a plurality of image processing software modules, sets of pointers associated with stored images, information on pixel spacing and safe/unsafe logical image information. The apparatus of the present invention can be implemented using less memory and/or a less powerful processor because of the advantages conveyed by utilization of the methods of the present invention embodied in the image processing software modules used to control the processor.

Numerous additional features and aspects of the methods and apparatus of the present invention are set forth in the detailed description that follows.

BRIEF DESCRIPTION OF THE DRAWINGS

FIG. 2 illustrates a known image padding operation.

FIGS. 7, 8A, 8B and 9 illustrate methods of storing, accessing, and processing data representing an image in accordance with various embodiments of the present invention.

FIG. 10 illustrates an image stored in accordance with one embodiment of the present invention.

FIGS. 11A, 11B, 12, 13, 14A and 14B illustrate various image padding operations implemented in accordance with the present invention.

FIGS. 18, 19, and 20 illustrate additional image processing operations that can be implemented in accordance with the present invention, including mirror imaging an image (left to right), flipping an image (top to bottom), and a 180° image rotation, respectively.

DETAILED DESCRIPTION

As discussed above, the present invention is directed to methods and apparatus for efficiently storing, accessing, and processing information representing images. The apparatus of the present invention for performing these functions will first be discussed with reference to FIG. 5.

Figure 5:
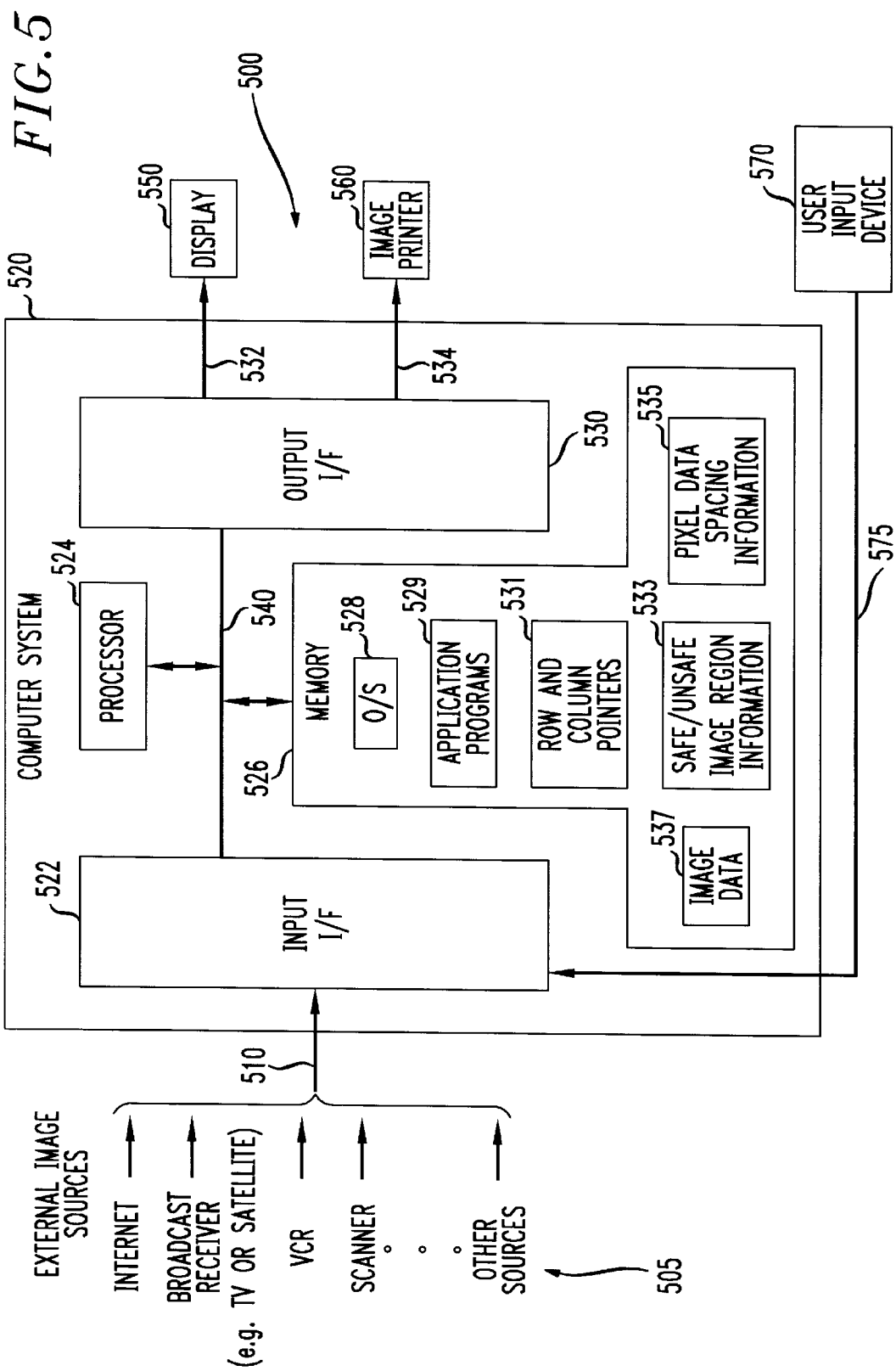
FIG. 5 illustrates an image processing system implemented in accordance with one exemplary embodiment of the present invention.

Referring now to FIG. 5, there is illustrated a high-level block diagram of a system 500 that implements the present invention. As shown, the system includes a computer system 520 which itself comprises an input interface 522, a processor 524, a memory 526 and an output interface 530, all conventionally interconnected by bus 540. Memory 526, which generally includes different modalities, all of which are not specifically shown for simplicity may be implemented using random access memory (RAM) and/or hard disk storage and/or other removable media drives, such as, e.g., CD-ROM drives, which are capable of reading information stored on a computer-readable medium such as a CD-ROM. In accordance with the present invention the memory 526 stores an operating system (O/S) 528, image data 537, application programs 529, row and column pointers 531, safe/unsafe region image information 533, and pixel data spacing information 535. O/S 228 may illustratively constitute the WINDOWS NT operating system presently available from the Microsoft Corporation of Redmond, Washington (WINDOWS NT is a registered trademark of the Microsoft Corporation). As will be discussed in detail below, in accordance with one embodiment of the present invention, row and column pointers and safe/unsafe image region information are associated with each stored image. To reduce memory requirements and to simplify image processing operations, the need to support two full sets of actual pointers, i.e., one set for rows and one set for columns, the column pointers may be implemented as offsets to be added to the row pointers. Alternatively, the row pointers may be implemented as offsets to be added to the column pointers. Thus, from a software standpoint, the present invention can be implemented using one array of actual pointers with offsets to the actual pointers being used as pointers (row or column in the case of a 2-D image) for all other dimensions of an image. In such an embodiment, the location in memory where data representing a particular pixel is stored can, in the case of a two dimensional image, be obtained by simply adding row and column pointer values.

The pointers and safe/unsafe image region information is stored within memory in areas 531, and 533, respectively. Optional information regarding the spacing between image pixel data, e.g., column spacing, within the memory 526 may be associated with each stored image. The column spacing information is stored in memory area 535.

Incoming images, in the form of digital data, are provided to system 500, via input path 510, through a wide variety of sources—all of which are collectively referenced as sources 505. These sources, of which only a few are specifically shown, illustratively include: images provided through an Internet connection, from a broadcast receiver (such as a television or satellite receiver), from a video cassette recorder (VCR) or digital camera, from a live video feed(s), from an external database(s), and/or from a document scanner. Inasmuch as the present invention will function with images regardless of their source, the particular modality through which any such image is physically provided to system 500 is immaterial. Input interface (I/F) 522 is connected to path 510 and contains appropriate circuitry to provide the necessary and corresponding electrical connection, e.g. modem or network interfaces for Internet access, required to physically connect and interface each differing source of incoming digitized images to computer system 520. In addition, input interface 522 electrically connects and interfaces user input device 570, such as a keyboard and mouse, to computer system 520. Display 550, such as a conventional color monitor, and image printer 560, such as a conventional color laser printer or other well-known color printer, are connected, via leads 532 and 534, respectively, to output interface 530. Output interface 530 provides requisite circuitry to electrically connect and interface display 550 and printer 560 to the computer system 520.

In operation, once an incoming image (from whatever source) is applied to system 520, it is stored therein, in accordance with the image storage method of the present invention. The stored image becomes part of an image database residing within memory 526 and typically within hard disk storage therein (though not specifically shown). The stored image can subsequently be processed by processor 524 under control of one or more image processing application programs 529 and specifically those software applications, as discussed below, that implement the inventive image storage, access and processing methods of the present invention.

A user can invoke the application implementing the present invention, through appropriate commands entered via device 570 or select the program icon appearing on display 550 that represents the application.

Figure 6:
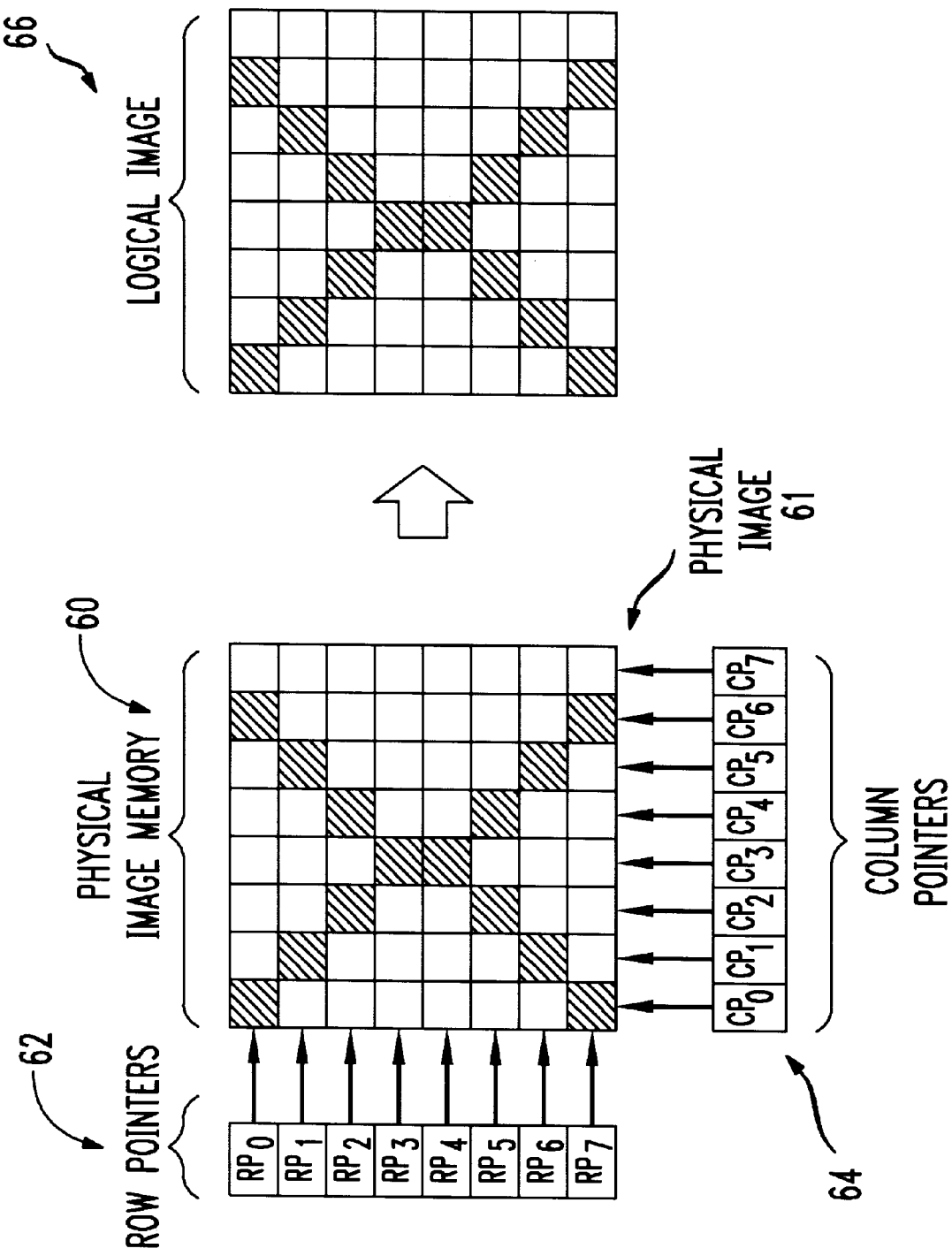
FIG. 6 illustrates the use of row and column pointers to identify image data stored in a physical image memory in accordance with one embodiment of the present invention.

Various features of the method of storing, accessing, and processing images in accordance with the present invention will now be discussed with reference to FIG. 6. FIG. 6 illustrates a block of physical image memory 60 into which data representing an image 61, which will be referred to as a physical image, has been stored in consecutive memory locations. Accordingly, the physical image 61 is stored in a regularly spaced image memory 60. In accordance with the present invention sets of both row and column pointers 62, 64, respectively, are associated with the physical image memory 60. These sets of pointers 62, 64 may be used to access the physical memory locations to which the row and column pointers 62, 64 point. Using the row and column pointers 62, 64 to access the physical image memory 60 sequentially starting with the memory location specified by the first set of row and column pointers ($RP_0$, $CP_0$) and ending with the memory location specified by the last set of row and column pointers ($RP_7$, $CP_7$) creates the logical, e.g., virtual, image 66.

Because, in the case of the FIG. 6 illustration, each of the row pointers 62 and the column pointers 64 point to the corresponding row and column, respectively, of the physical image 61, the physical and logical images are identical.

As will be discussed in greater detail below, the present invention overcomes many of the drawbacks to the known image processing techniques, in terms of memory and computational requirements, through a novel and innovative method of using row and column pointers to access memory locations. These locations correspond to rows and columns of either a physical or logical image. In accordance with the present invention, many image processing operations are performed by creating and manipulating sets of row and column pointers. In the case of many common image processing operations, this eliminates the need to copy and access the data stored in the physical image memory 60 when performing an image processing operation, e.g., a padding operation.

In accordance with one feature of the present invention, row and column pointers are used in combination with data, e.g., safe/unsafe logical region information, that indicates which areas of a virtual image correspond directly to the physical image. Logical image regions which directly correspond to physical image regions are designated as "safe regions" where fast and efficient methods of accessing pixel data can be used and both row and column pointers need not be used to access each individual memory location. Areas of the logical image which do not correspond directly to the physical image are designated as "unsafe" regions where somewhat slower memory access techniques need to be employed, e.g., using the row and/or column pointers 62, 64 of the present invention to access the physical memory locations corresponding to the unsafe regions of a logical image.

The storing, accessing, and processing of digital data representing an image in accordance with one exemplary embodiment of the present invention will now be discussed with reference to FIG. 7 and with periodic references to FIGS. 5 and 10.

FIG. 7 illustrates a main routine 700 which is responsible for implementing various features of the present invention, e.g., when executed by the processor 524 of the computer system 520. The main routine 700 and various subroutines of the present invention may be implemented as one or more distinct image processing software modules which comprise one of the applications stored in the memory 526.

As illustrated, the main routine 700 begins in step 702 when the processor 524 starts to execute the main routine, e.g., by executing an application in memory corresponding to the main routine 700. Operation progresses to step 704 where digital data representing an image, e.g., the physical image 1001 of FIG. 10 is received from an external image source 505, e.g., a scanner, and supplied via the input I/F 522 and bus 540, to the processor 524 and memory 706. In step 704, the received image data is stored in a block of physical memory 1000 located in the memory 526. In accordance with the present invention, the data representing each of the pixels of the image 1001 is stored sequentially, beginning with the data representing the first pixel of the first row represented by the number 101 and ending with the data representing the last pixel of the last row represented by the number 116. In addition, a fixed amount of data, e.g., one byte, is used to represent each pixel. Accordingly, columns of pixel data are separated by one byte in memory and rows are separated by a fixed predictable number of memory locations since each row includes a fixed number of pixels, e.g., four in the case of the image 1001. Accordingly, the physical image memory 1000 is regular in terms of pixel data spacing.

From step 706, operation progresses to step 708 in which row and column pointers are generated by the processor 524 for the stored image 1001. In this example, a row pointer (RP) and a column pointer (CP) is generated for each row and column of the image 1001 to thereby create a set of four row and four column pointers 1002, 1004 respectively. The column pointers $CP_0, CP_1, CP_2, CP_3$ may be implemented as offsets to be added to a row pointer $RP_0, RP_1, RP_2$ or $RP_3$ to identify a physical memory location corresponding to (row, column) coordinates. The generated sets of row and column pointers 1002, 1004 are stored in the portion 531 of the memory 526 and designated as corresponding to the physical image 1001.

In step 710, the entire region of the logical image 1005, which may be accessed using the row and column pointers 1002, 1004 is designated as a safe image region 1050. To reiterate, a safe image region is a regularly spaced region of memory where image data may be accessed using relatively efficient memory access techniques and where the logical image 1005 generated by using the row and column pointers 1002, 1004 to access the physical memory 1000 results in an image that is the same as the physical image 1001. Thus, a safe image region corresponds to a portion of regularly spaced physical image memory where the logical image 1005 can be obtained using the same efficient memory access techniques that can be used to produce the physical image 1001.

As will be discussed below, various image processing operations may result in a set of row and column vectors which, when used to access memory by image row and column coordinates, result in a different image, i.e., a logical or virtual image, than the physical image 61 that is stored in the memory space 60. Regions where row and column vectors do not correspond directly to the stored physical image are considered unsafe memory regions which are accessed using the row and column pointers 1002, 1004 of the present invention. At the time an image is originally received and stored in the above described manner, only safe image regions will normally exist.

Referring once again to FIG. 7, operation progresses from step 710 to step 712 in which input is obtained from, e.g., the user input device 570 or from a subroutine which has performed only part of a specified image processing operation, e.g., the padding portion of a specified operation. The received input may be information specifying a signal to terminate the main routine 700, or information specifying a particular image processing operation, e.g., a padding, enlargement, reduction, or convolution operation. In addition, the type of image padding to be performed may also be included in the input when a padding operation or an operation requiring image padding is specified.

Once an input signal is received, it is examined in step 714 to determine if an image processing operation has been specified or if an end signal was received. If the input does not fall into one of these two categories, it is assumed that an input error has occurred and operation progresses to step 712 where new input is sought. If an end signal is detected in step 714 operation progresses to step 716 and the main routine stops execution. However, if an image processing operation is specified, operation progresses to step 718.

In step 718, a determination is made as to whether the specified image processing operation can be performed as a virtual operation, e.g., through the generation and/or manipulation of row and column pointers 1002, 1004 or whether a physical image processing operation, e.g., an operation which requires the accessing of the physical image memory 1000 to obtain image pixel data, is specified. Operations which may be implemented as virtual image processing operations in accordance with the present invention, include, e.g., padding, enlargement, and reduction operations. Operations which require image pixel data to be performed include convolution and brightening operations. Accordingly, convolution and brightening are treated as physical image processing operations. Such physical image processing operations of this type will often require data representing the processed image to be stored in a distinct physical memory location from the original physical image in those embodiments where the original physical image is to be preserved for future image processing operations.

It should be noted that portions of a physical image processing operation may sometimes be performed as a virtual operation. Image padding, which is part of, e.g., a convolution operation, is an example of a portion of a physical image processing operation that may be performed as a virtual image processing operation.

If, in step 718, it is determined that the specified image processing operation can be performed as a virtual image processing operation, the method progresses to step 720, otherwise operation progresses to step 722.

Figure 8A:
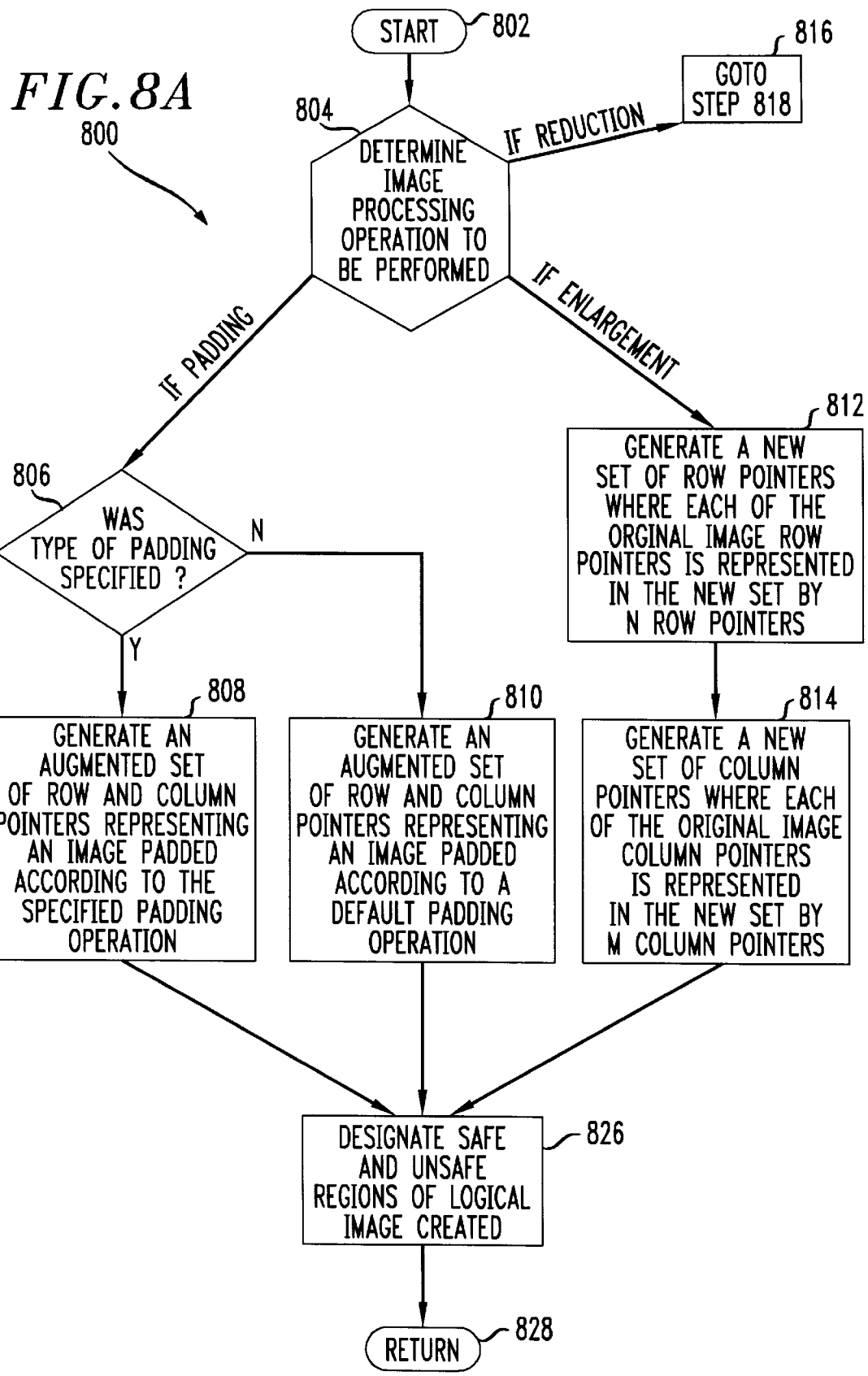

From step 720 operation progresses to the beginning of the virtual image processing operation subroutine 800 illustrated in FIGS. 8A and 8B. From step 722 operation progresses to the physical image processing subroutine 900 illustrated in FIG. 9. As will be discussed below, upon completion of the image processing subroutines operation returns to the main image processing routine and progresses from step 720 or 722 to step 712 of the main routine.

The virtual image processing subroutine 800 of the present invention will now be described with reference to FIGS. 8A and 8B. In accordance with the present invention, many operations that would normally be performed by accessing and processing, e.g., copying, the data representing the physical image 1001, are achieved by merely generating and/or manipulating row and column pointers. Frequently, this allows image processing operations that would require accessing N×M memory locations, e.g., the memory locations containing the pixel data for an N×M image, to be implemented by performing approximately N+M memory access operations. That is, approximately 2N memory access operations involving the accessing and/or generation of row and column pointers. In addition, by performing an operation virtually, the amount of memory required to implement the operation, e.g., a copy or pad operation, is substantially reduced as compared to known systems. Thus, the virtual image processing technique of the present invention offers substantial savings in terms of computational requirements, processing time, and the amount of memory required to perform an image processing operation as compared to known image processing techniques.

As illustrated in FIG. 8A the virtual image processing subroutine 800 begins with the start step 802. In the step 802, the processor 524 begins running the portion, i.e., module, of the application program corresponding to the virtual image processing subroutine 800. From step 802, operation progresses to step 804 wherein the type of image processing operation to be performed is determined.

Figure 11B:
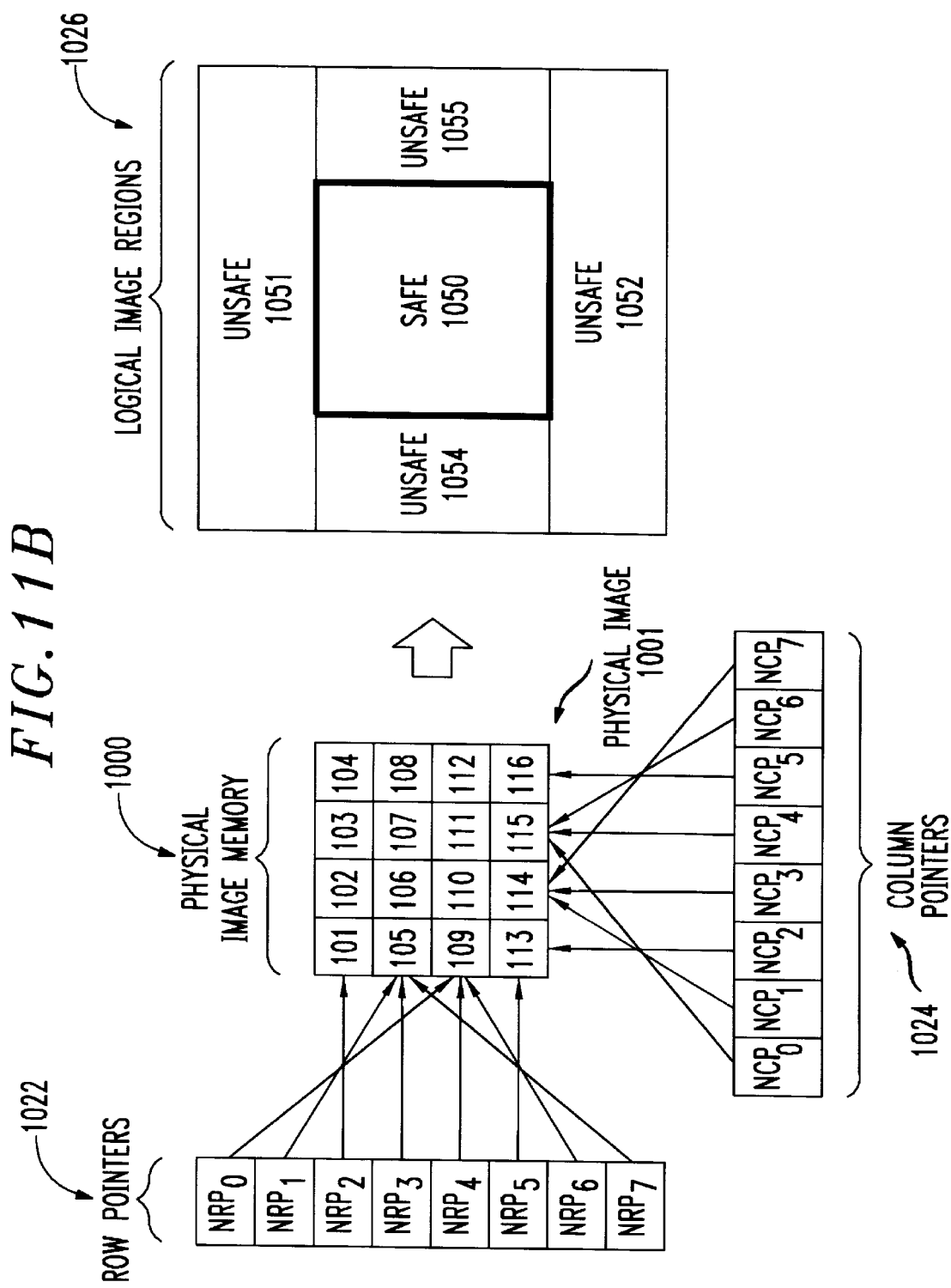

If a padding type operation is to be performed operation progresses from step 804 to 806. The performing of a padding operation will first be described with reference to FIGS. 10, 11A and 11B. FIGS. 11A and 11B which illustrate a reflective padding type operation being performed on the 4×4 physical image 1001, which was stored in accordance with the present invention as illustrated in FIG. 10. Other types of padding operations that can be implemented in accordance with the present invention will be briefly described with reference to FIGS. 12–14.

FIG. 10 illustrates a 4×4 physical image 1001 that has been stored in the physical image memory 1000. For purposes of explanation, rather than using shading to represent the stored pixels in FIG. 10, each pixel has been assigned a number, e.g., the pixels of row 0 have been assigned numbers 101–104, the pixels of row 1, numbers 105–108, the pixels of row 2, numbers 109–112, and the pixels of row 3, numbers 113–116. In accordance with the present invention, a set of row pointers 1002 and column pointers 1004 have already been generated for the stored physical image 1001. At this point the logical image 1005 and the physical image 1001 are identical and therefore the entire logical image 1005 comprises a single safe logical image region 1050.

In step 806 it is determined if a particular type of padding operation was specified, operation progresses to step 808. Otherwise operation progress to step 810 so that a default type padding operation can be performed.

In both steps 808 and 810 a padding operation is performed by generating an augmented set of row and column pointers 1022, 1024 which correspond to a logical padded image produced by the padding operation. The value of the additional pointers generated to augment the set of original pointers determines the specific type of padding operation that will be implemented as a virtual operation.

For example, consider FIG. 11A which illustrates a set of augmented row and column pointers 1022, 1024, respectively, which have been generated to implement what is commonly referred to as a reflective type padding operation. Each set of row and column pointers 1022, 1024 includes a total of eight pointers ($NRP_0$, $NRP_1$, $NRP_2$, $NRP_3$, $NRP_4$, $NRP_5$, $NRP_6$, $NRP_7$) and ($NCP_0$, $NCP_1$, $NCP_2$, $NCP_3$, $NCP_4$, $NCP_5$, $NCP_6$, $NCP_7$), respectively. Note that four of the new row pointers and four of the new column pointers ($NRP_2$, $NRP_3$, $NRP_4$, $NRP_5$) and ($NCP_2$, $NCP_3$, $NCP_4$, $NCP_5$) correspond directly to the original four row and column pointers of the sets 1002, 1004. The two new row and column pointers added at the beginning and the two new row and column pointers added at the end of the original set of row and column pointers form the augmented sets 1022, 1024. The addition of these new row and column pointers results in the original image being padded around its borders.

In particular, to implement the illustrated virtual reflection padding operation $NRP_0$ is set to the value of original $RP_2$, $NRP_1$ is set to the value of original $RP_1$, $NRP_6$ is set to the value of original $RP_2$, and $NRP_7$ is set to the value of original $RP_1$. Similarly, $NCP_0$ is set to the value of original $CP_2$, $NCP_1$ is set to the value of original $CP_1$, $NCP_6$ is set to the value of original $CP_2$, and $NCP_7$ is set to the value of original $Cp_1$.

The logical image 1025 created as a result of the logical padding operation includes a logical copy of the physical image 1001 surrounded on all four sides by two pixels.

Once the augmented sets of pointers 1022, 1024 are generated in step 808 or 810, operation progress to step 826 wherein the regions of the logical image represented by the sets of row and column pointers 1022, 1024 are designated as corresponding to safe or unsafe logical image regions.

FIG. 11B illustrates the result of the logical padding operation of FIG. 11A, in terms of a block of safe and unsafe logical image regions 1026. As illustrated, the areas of the logical image 1025 which do not exist in the physical image are designated as unsafe logical image regions 1051, 1054, 1055, 1052. However, the portion 1050 of the logical image 1025 which directly corresponds to the original physical image remains a safe region which may be accessed using efficient memory access techniques.

Figure 12:
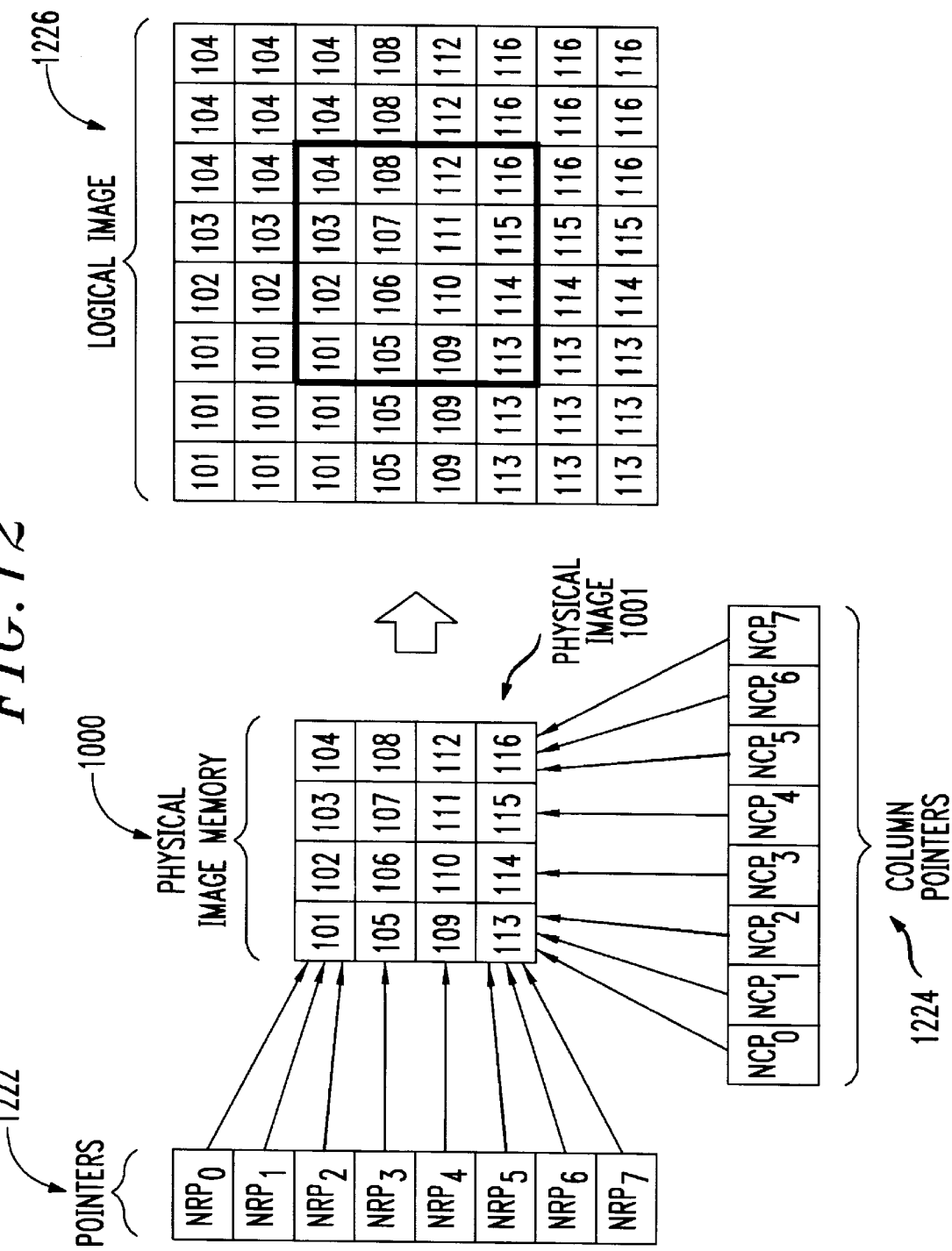

FIG. 12 illustrates a repeat, also known as replicated, padding type operation, implemented on the physical image 1001 in accordance with the virtual image processing method of the present invention. In this padding operation the generated row pointers $NRP_0$, $NRP_1$ of the set of row pointers 1222 are both set to the value of original $RP_0$ while both $NRP_6$ and $NRP_7$ are set to the value of original $RP_3$. Similarly, the generated column pointers $NCP_0$ and $NCP_1$ of the set of column pointers 1222 are both set to the value of original $CP_0$ while both $NCP_6$ and $NCP_7$ are set to the value of original $CP_3$. The logical image 1226 resulting from the repeat padding operation is illustrated on the right-hand side of FIG. 12.

Figure 13:
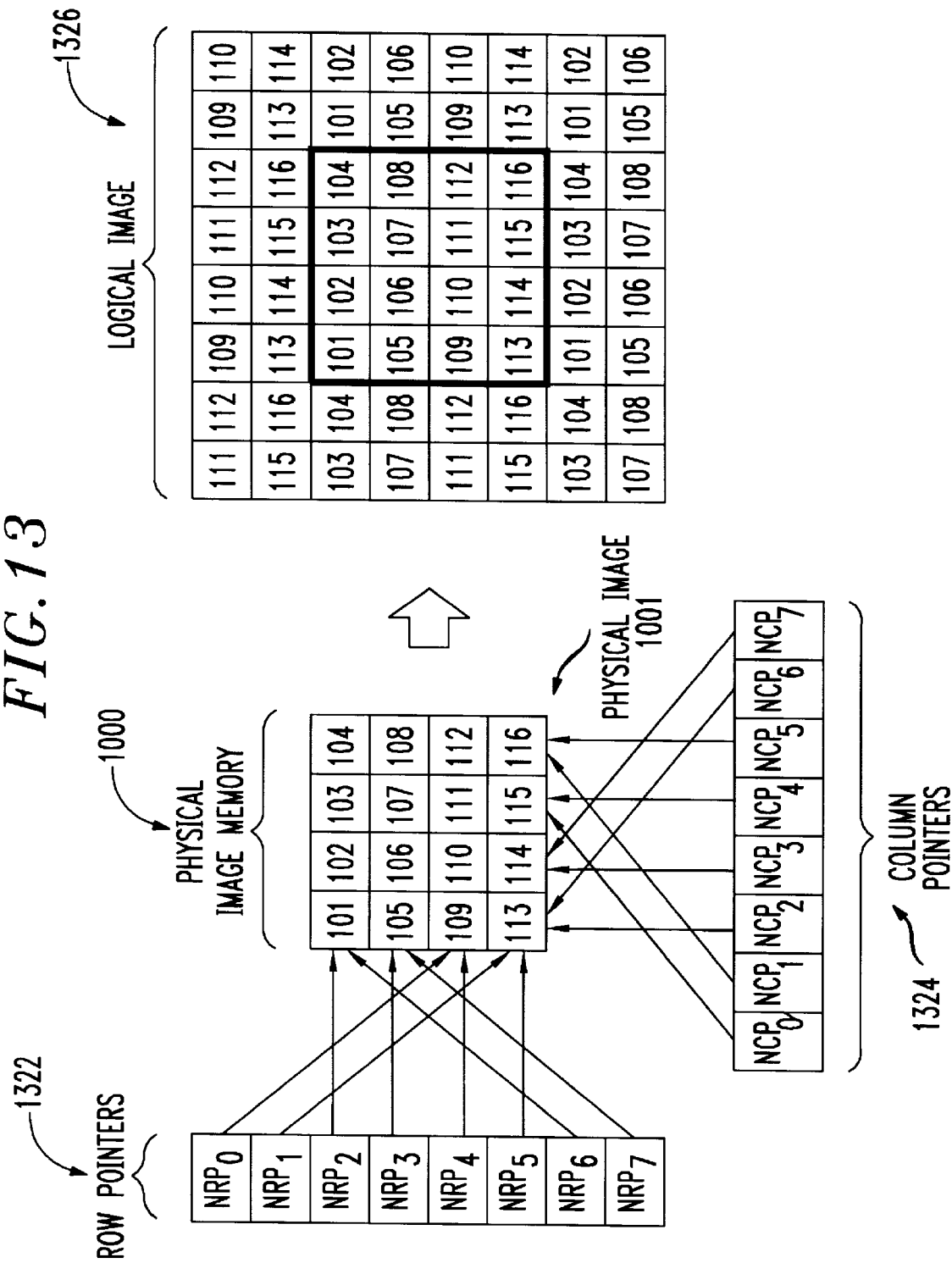

Referring now briefly to FIG. 13, still another padding operation, i.e., a toroidal padding type operation, is illustrated. Toroidal padding operations are sometimes referred to as cyclic padding operations. In order to implement the toroidal padding type operation on the physical image 1001 new row pointer $NRP_0$ is set to the value of original $RP_2$, $NRP_1$ is set to the value of original $RP_3$, $NRP_6$ to the value of original $RP_0$ and $NRP_7$ to the value of original $RP_1$. Similarly, new column pointer $NCP_0$ is set to the value of original $CP_2$, $NCP_1$ to the value of original $CP_3$, $NCP_6$ is set to the value of original $CP_0$ and $NCP_7$ is set to the value of original $CP_1$. The logical image 1326 resulting from the repeat padding operation is illustrated on the right-hand side of FIG. 13.

Figure 14A:
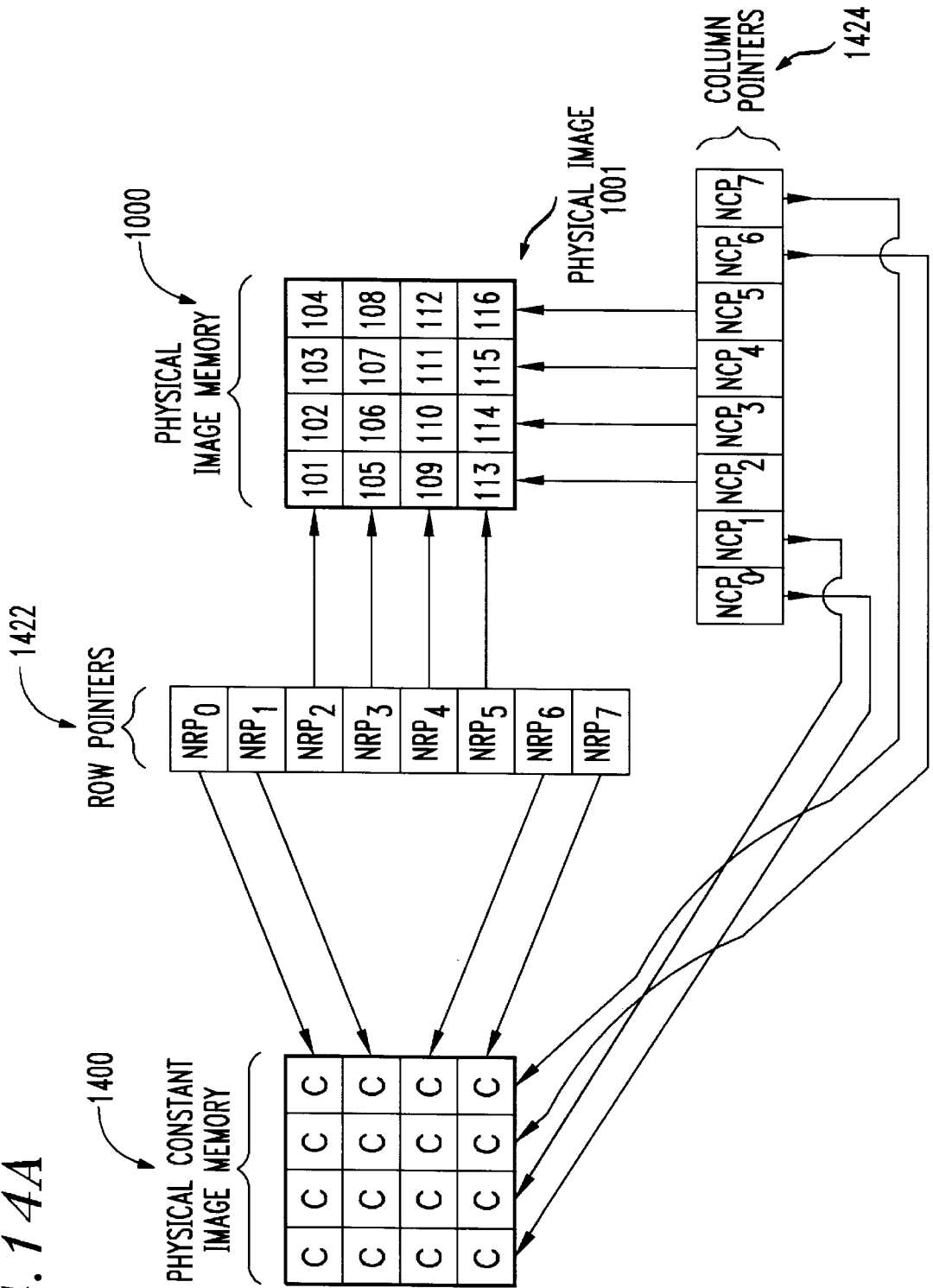

Referring now briefly to FIGS. 14A and 14B, a constant padding type operation is illustrated. Unlike the previously described padding operations, the constant padding operation involves generating pointers to memory locations, e.g., a block of memory locations 1400, which contain the constant value to be used for padding purposes. In the illustrated embodiment a physical constant image memory space 1400 equal to or larger than the physical image 1001 is used. The constant memory space is a contiguous block of memory up to twice the size of the physical image memory space 1000. By using such a large constant padding memory space 1400 the constant values may be accessed by simply using column pointers which are offset values to be added to the value of the row pointers. When a column is to be added through this technique and offset values are used for column pointers, the constant padding memory space should be twice the image memory space in size. However, when one or more consecutive rows are to be padded in such an embodiment, the constant memory space 1400 need only exceed the physical memory space in size by an amount corresponding to the number of rows to be padded. In this manner by allocating more constant image memory than physical image memory 1000, it is possible to perform a constant padding operation without the risk of accessing a memory location in which constant data or physical image data is not stored.

In order to implement the constant type padding operation on the physical image 1001, in the illustrated embodiment, new row pointer $NRP_0$ is set to a value which points to the memory location of the first constant in the first row of the physical constant image memory 1400. $NRP_1$ is set to a value which points to the memory location of the first constant in the second row of the physical constant image memory 1400, $NRP_6$ is set to a value which points to the memory location of the first constant in the third row of the physical constant image memory 1400 and $NRP_7$ is set to a value which points to the memory location of the first constant in the fourth row of the physical constant image memory 1400. In addition, $NCP_0$ is set to a value which indicates the column offset to be used to access the first column of the physical constant image memory 1400. $NRP_1$ is set to a value which indicates the offset to be used to access the second column of the physical constant image memory 1400, $NRP_6$ is set to a value which indicates the offset to be used to access the third column of the physical constant image memory 1400, and $NRP_7$ is set to a value which indicates the offset to be used to access the fourth column of the physical constant image memory 1400.

The logical image 1426 resulting from the constant padding operation is illustrated in FIG. 14B.

Note that each of the padding operations illustrated in FIGS. 12–14B results in a block of safe and unsafe logical image regions which are the same as those illustrated in FIG. 11B.

Having described various padding operations in accordance with the present invention, we will return to a description of the remaining steps of the virtual image processing subroutine 800 illustrated in FIGS. 8A and 8B.

In step 804, if it is determined that an enlargement operation is to be performed, operation progresses to step 812. In steps 812 and 814 an NxM virtual enlargement operation is performed. This is achieved by first generating, in step 812, a new set of row pointers, e.g., the row pointers 1522 of FIG. 15, to achieve vertical enlargement by a factor of N. Each of the original image row pointers is represented in the new set 1522 by N row pointers. After the new set of row pointers 1522 is generated, a new set of column pointers 1524 is generated to perform the enlargement in the horizontal direction. Each of the original image column pointers is represented in the new set 1524 by M row pointers. In practice, it is possible to reverse the order of the row and column pointer operations of steps 812, 814 or to perform these operations in parallel.

Figure 15:
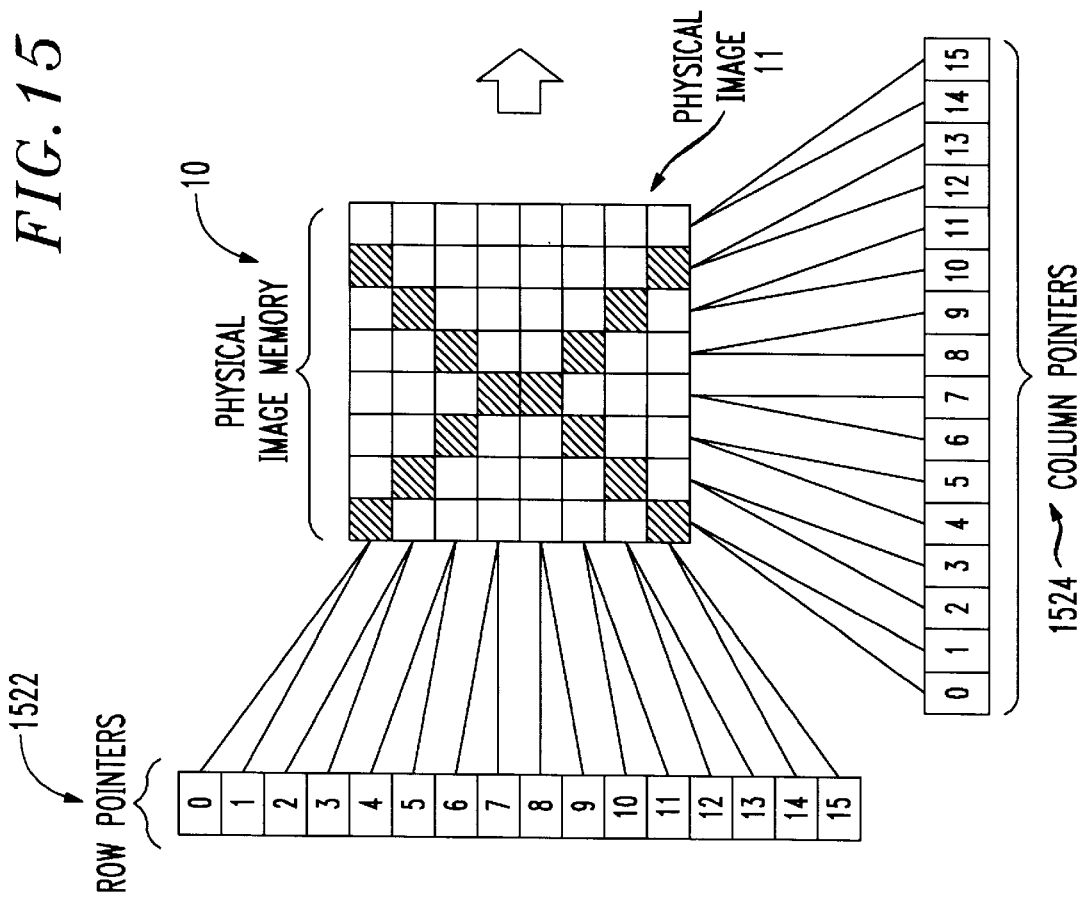
FIG. 15 illustrates an image enlargement processing operation implemented in accordance with one embodiment of the present invention.

In the example of FIG. 15, for ease of illustration, the pointers which comprise the sets 1522, 1524 of row and column pointers are merely identified in FIG. 15 using the numbers 0–15 without the prefix NRP or NCP respectively. FIG. 15 illustrates a 2x2 enlargement operation performed on the physical image 11 via the generation of the row and column pointers 1522, 1524. As illustrated, the logical image 1526 resulting from the virtual enlargement operation is twice the size of the original image.

Figure 3:
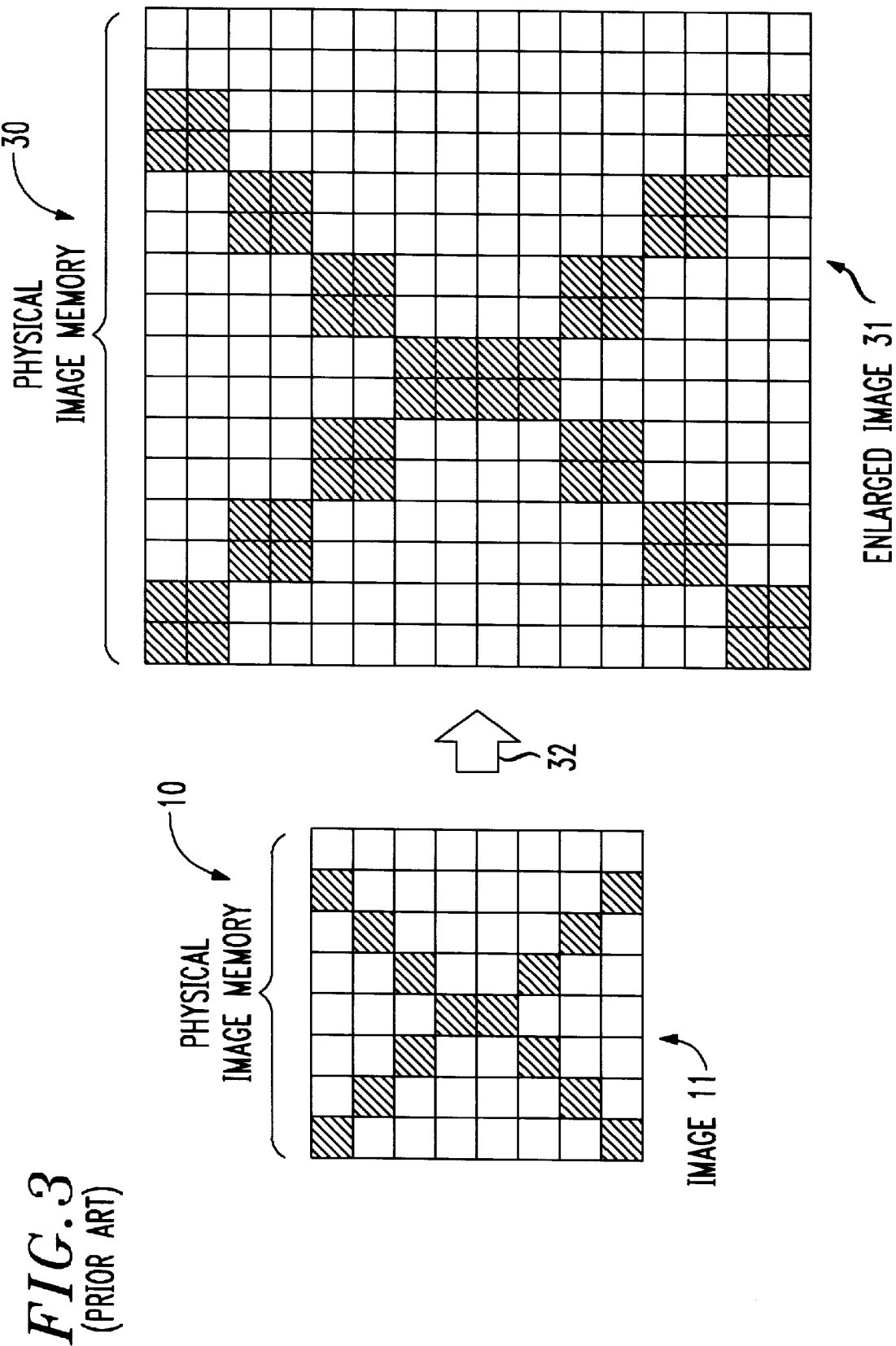
FIG. 3 illustrates a known image enlargement operation.

In the above described manner, an image can be enlarged by performing an operation that requires only a fraction of the memory and memory access operations required to implement a conventional enlargement operation of the type illustrated in FIG. 3 and without accessing or duplicating any of the image data.

Upon completion of the row and pointer column generation operations, in steps 812 and 814, operation progresses to step 826. In step 826, after an enlargement operation, the entire logical image 1526 is designated as an unsafe region for memory access purposes.

Referring once again to step 804, if it is determined that a reduction operation has been specified operation progresses to step 818 of the virtual image processing subroutine illustrated in FIG. 8B via the goto step 816.

Figures 16, 17:
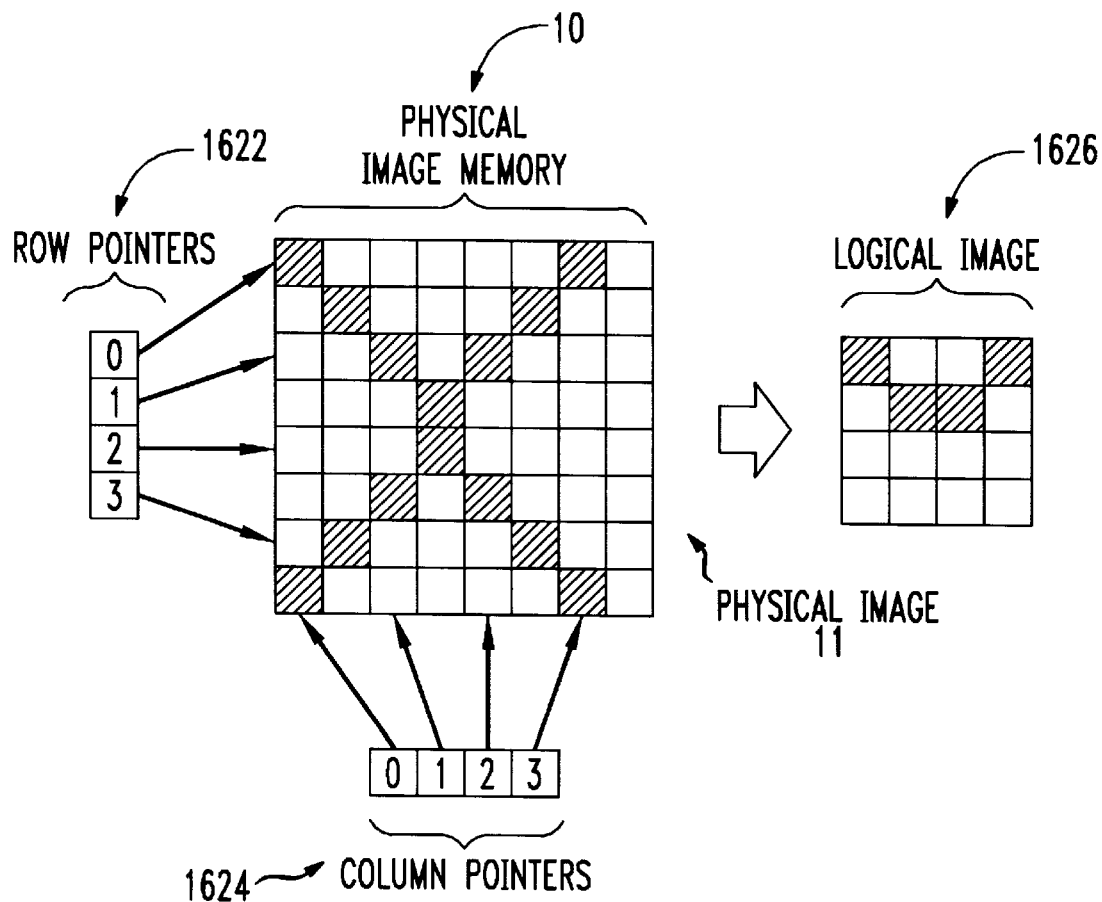
FIG. 16 illustrates an image reduction processing operation implemented in accordance with the present invention.
FIG. 17 illustrates a kernel which can be used to implement a convolution operation in accordance with various embodiments of the present invention.

In step 818 a new set of row pointers, e.g., the row pointers 1622 of FIG. 16 is generated. The prefixes NRP and NCP are omitted from the row and column pointers sets 1622, 1624 of FIG. 16 for ease of illustration. The new set of row pointers includes a single row pointer for every N of the original row pointers. In this manner, a reduction in the vertical image size by a factor of N is achieved. Next, in step 820, a new set of column pointers 1624 is generated. The new set of column pointers 1624 includes a single column pointer for every M of the original column pointers. In this manner, a reduction in the horizontal image size is achieved. As with the case of enlargement, the order of the horizontal and vertical image processing operations 818, 820 is not important and, in fact, these operations can be performed in parallel if desired.

Figure 1A:
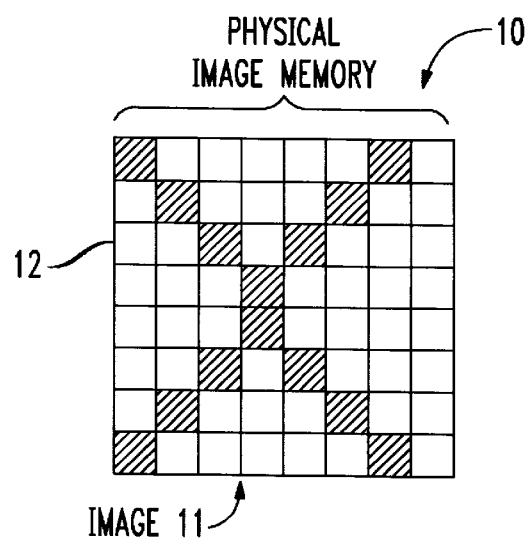
FIGS. 1A and 1B illustrate images stored in blocks of physical memory in accordance with prior art techniques.
Figure 1B:
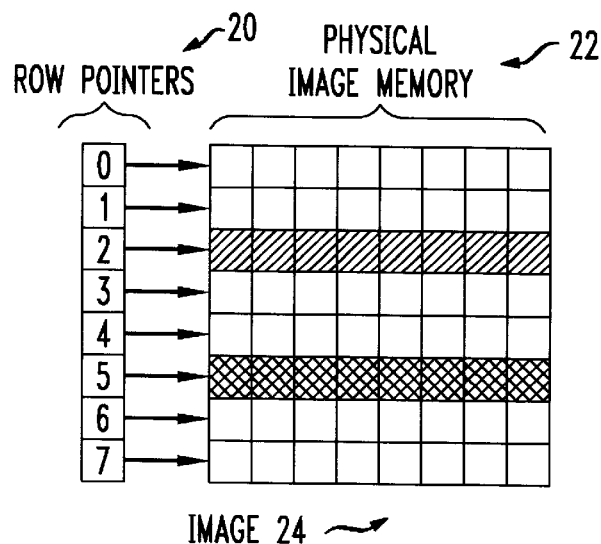
Figure 4:
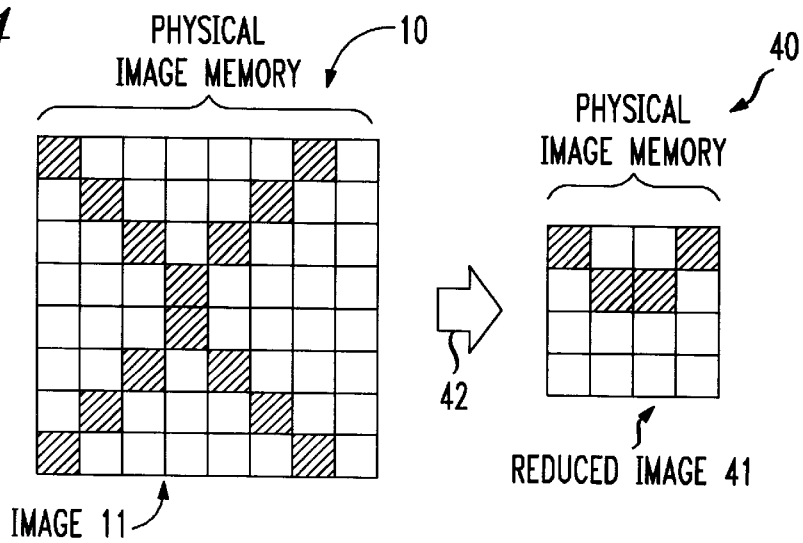
FIG. 4 illustrates a known image reduction operation.

FIG. 16 illustrates a 2x2 reduction which is achieved in accordance with the present invention. As illustrated, the logical image 1626 which is one half the size of the original physical image 11 in both the horizontal and vertical directions results from the 2x2 reduction operation. Note that the reduction operation illustrated in FIG. 16 requires far fewer memory access operations and fewer memory locations to implement than does the prior art image reduction technique illustrated in FIG. 4.

After the new set of row and column pointers 1622, 1624 are generated, operation progresses to step 822. In step 822 pixel data image spacing information, e.g., stored in the memory space 535, is updated to indicate that pixel data and thus columns in the logical image 1626 are spaced, in this example, twice as far apart, as were the pixel data and columns in the original physical image 11. Once the pixel data spacing information for the logical image 1626 is set, operation progresses from step 822 to step 826.

In step 826, after a reduction operation is performed, the entire logical image 1626 is designated as a safe region of memory. Note that the data representing the reduced size logical image 1626 is uniformly spaced in memory. Also note that accessing the physical image memory 10 using the updated pixel data spacing information and efficient memory access techniques will result in the same image 1626 that will be produced by using the row and column pointers 1622, 1624 to access the physical image memory 10.

After the safe and unsafe regions of the logical image created by a virtual processing image operation are designated in step 826, the virtual image processing subroutine 800 progresses to step 826 which is a return step. From step 826, operation returns to the point in the main routine or another subroutine from which the virtual image processing subroutine was started.

Having completed the discussion of the virtual image processing subroutine 800 of the present invention, the physical image processing subroutine 900 will now be discussed.

After the main image processing routine 700 determines, in step 718, that a specified image processing routine can not be performed completely as a virtual image processing operation, the physical image processing subroutine 900 is called in step 722. is The physical image processing subroutine 900 begins with the start step 902 wherein the module representing the physical image processing subroutine is initialized and executed by the processor 524. Operation progresses from the start step 902 to the decision step 904. In step 904 a determination is made as to whether a padding operation is required for the specified image processing operation, e.g., because it involves the use of neighboring pixel values. Convolution is one example where a padding operation may be performed as part of the convolution image processing operation. If a padding operation is required, operation progresses to step 906 which calls the virtual image processing subroutine 800 to perform the required padding operation.

After a required padding operation is completed by the virtual image processing subroutine 800, operation returns to step 906 and progresses therefrom to step 908.

If it is determined in step 904 that a padding operation is not required, operation progresses directly to step 908. An example of an operation where padding is not required is a pixel brightening operation. Note that such an operation does not require the use of a neighboring pixel value to be performed.

In step 908, the physical image memory corresponding to the logical image to be processed is accessed and the specified image processing operation is performed. In accordance with the present invention, different memory access techniques are used to access data in safe and unsafe logical image regions. In the safe logical image regions, a relatively efficient memory access technique is used to sequentially access the pixels in each row of the safe region. However, in the unsafe logical image regions memory access operations for each pixel are performed using both the row and column pointers corresponding to the pixel to be accessed.

In particular, in the safe logical image regions, the data representing each of the pixels is accessed sequentially beginning with the first pixel of the first row (SRs) and the first column (SCs) of the safe region and ending with the last pixel of the last row (SRe) and last column (SCe) of the safe region.

Pseudo code for accessing the pixel data in a safe region and performing an image processing operation therein in accordance with one exemplary embodiment of the present invention is set forth below:

```
set r = SRs
while r < ERs Do:
        set P = Rp[r] + CP[SCs]
        while P < RP[r] + CP[ECs]
                *P = [Replaceable Pixel Processing Operation]
                P = P + CI
        end while
end while
``` where:
 r is a variable;
 *P is a pointer to a memory location;
 P is the address of the memory location pointed to by *P;
 SRs is the starting, i.e., first, row of the safe region being accessed;
 ERs is the ending, i.e., last, row of the safe region being accessed;
 RP[r] is the row pointer for row r of the image being processed;
 SCs is the starting column of the safe region being processed;
 CP[SCs] is the column pointer corresponding to the column SCs;
 ECs is the ending column of the safe region being processed;
 CP[ECs] is the column pointer corresponding to the ending column of the safe region; and
 CI is the space in terms of memory locations in the physical memory between columns.

Pseudo code for accessing the pixel data in an unsafe region and performing an image processing operation thereon in accordance with one exemplary embodiment of the present invention is set forth below:

```
set r = SRu
while r < ERu Do:
        set c = SCu
        while c < ECu Do:
                *(RP[r] + CP[c]) = [REPLACEABLE OPERATION on pixel
                        data at physical memory
                        location identified by *(RP[r]
                        + CP [c])]
                c = c + 1
        end while
        r=r+1
end while
``` where:
 c and r are variables;
 SRu is the starting, i.e., first, row of the unsafe region being accessed;
 ERu is the ending, i.e., last, row of the unsafe region being accessed;
 RP[r] is the row pointer for row r of the image being processed;
 CP[c] is the column pointer for the column c of the image being processed;
 SCu is the starting column of the unsafe region being processed;
 CP[SCs] is the column pointer corresponding to the column SCs;
 ECu is the ending column of the unsafe region being processed;
 CP[ECu] is the column pointer corresponding to the ending column of the unsafe region.

For images with multiple safe or unsafe logical image regions, the column and row information for each of the memory regions is supplied to the appropriate routine and the image processing operation is performed separately for each of the logical regions. Accordingly, when processing an image having four unsafe logical regions 1051, 1054, 1055, 1052 and one safe memory region 1050, the above described unsafe memory access routine would be executed four times and the safe memory access routine would be executed once. It should be noted however, that the safe image region corresponding to the center portion of an image will usually include a far larger percentage of the image pixels than all the pixels in the unsafe image regions combined. Accordingly, the efficient memory access technique described above will normally be used to access data representing the majority of a logical image and the less efficient unsafe image region memory access technique will be used to access data representing only a relatively small portion of the image being processed.

The above described replaceable pixel processing operation may be, e.g., a brightening operation or a convolution operation.

In safe image regions, a brightening operation can be implemented by replacing the line for implementing a replaceable image processing operation in the above safe region pseudo code with:

$$*P=*P+5$$

In unsafe image regions, the brightening operation can be implemented by replacing the line for implementing a replaceable image processing operation in the above unsafe region pseudo code with:

$$*(RP[r]+CP[c])=*(RP[r]+CP[c])+5$$

A kernel for use in performing a convolution operation is illustrated in FIG. 17. Prior to performing a convolution or other neighborhood operation, e.g., an operation using neighboring pixel values, the safe region must be shrunk by the size of the operator being used to insure that attempts to access pixel values outside the actual safe image region will not be made by the neighborhood operator. For example, the safe region would be shrunk by a size of one pixel in all directions when using the convolution kernel illustrated in FIG. 17 since this kernel uses pixel values a distance of one pixel away from the center of the operator in all directions.

Once the size of the safe image region has been adjusted as discussed above, a convolution operation can be performed in the safe region with the illustrated kernel by using the following pseudo code. This can be done by replacing the line for implementing a replaceable image processing operation in the above safe region pseudo code with:

$$*P=*(P-CI)+*(P+CI)+*P(P-Nr)+*(P+Nr)$$

where:

Nr represents the physical memory offset between the location of the data representing the current pixel pointed to by *P and the adjacent neighboring pixel in the subsequent row directly beneath the current pixel.

In unsafe image regions a convolution operation using the illustrated kernel can be implemented using the following pseudo code. This can be done by replacing the line for implementing a replaceable image processing operation in the above safe region pseudo code with:

$$*(RP[r]+CP[c])=*(RP[r]+CP[c-1])+*(RP[r-1]+CP[r+1])++*(RP[r+1]+CP[c])+*(RP[r]+CP[c+1])$$

In view of the above discussion, it is apparent that the image data storage, access and processing methods of the present invention offer many advantages over prior art approaches particularly in cases of real time image processing applications and in cases of applications where physical memory and/or computational resources are limited e.g., due to cost constraints.

Figure 18:
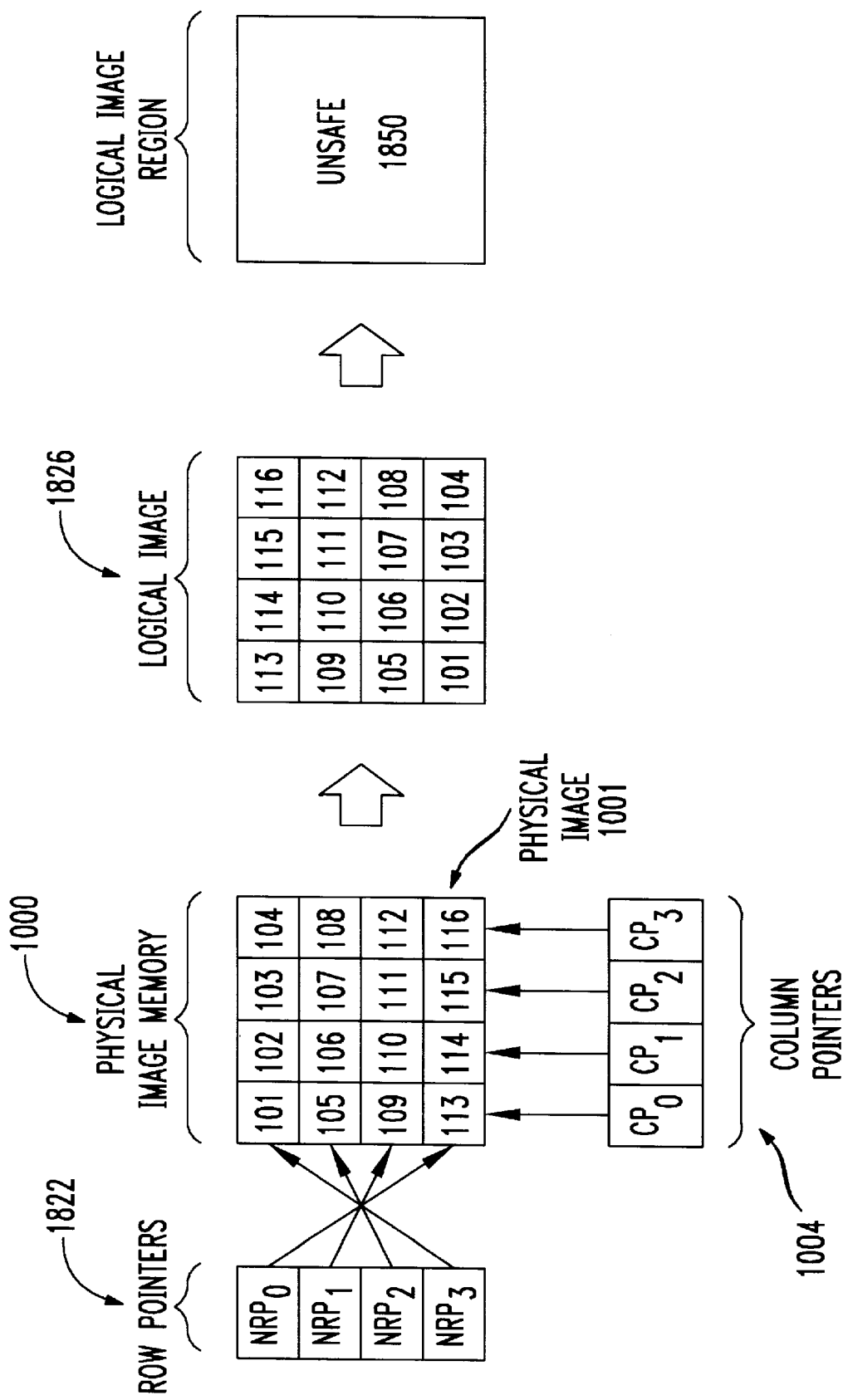

In addition, it is to be understood that the image processing techniques of the present invention can be applied to a wide range of image processing and manipulation operation in addition to those already discussed. For example, FIG. 18 illustrates a left to right mirror imaging operation that is performed in accordance with the present invention, as a virtual image processing operation. The virtual image processing operation involves generating a new set of row pointers 1822 as illustrated in FIG. 18 and designating the entire logical image 1826 represented by the set of new row pointers 1822 and column pointers 1004 as corresponding to an unsafe image region 1850.

Figure 19:
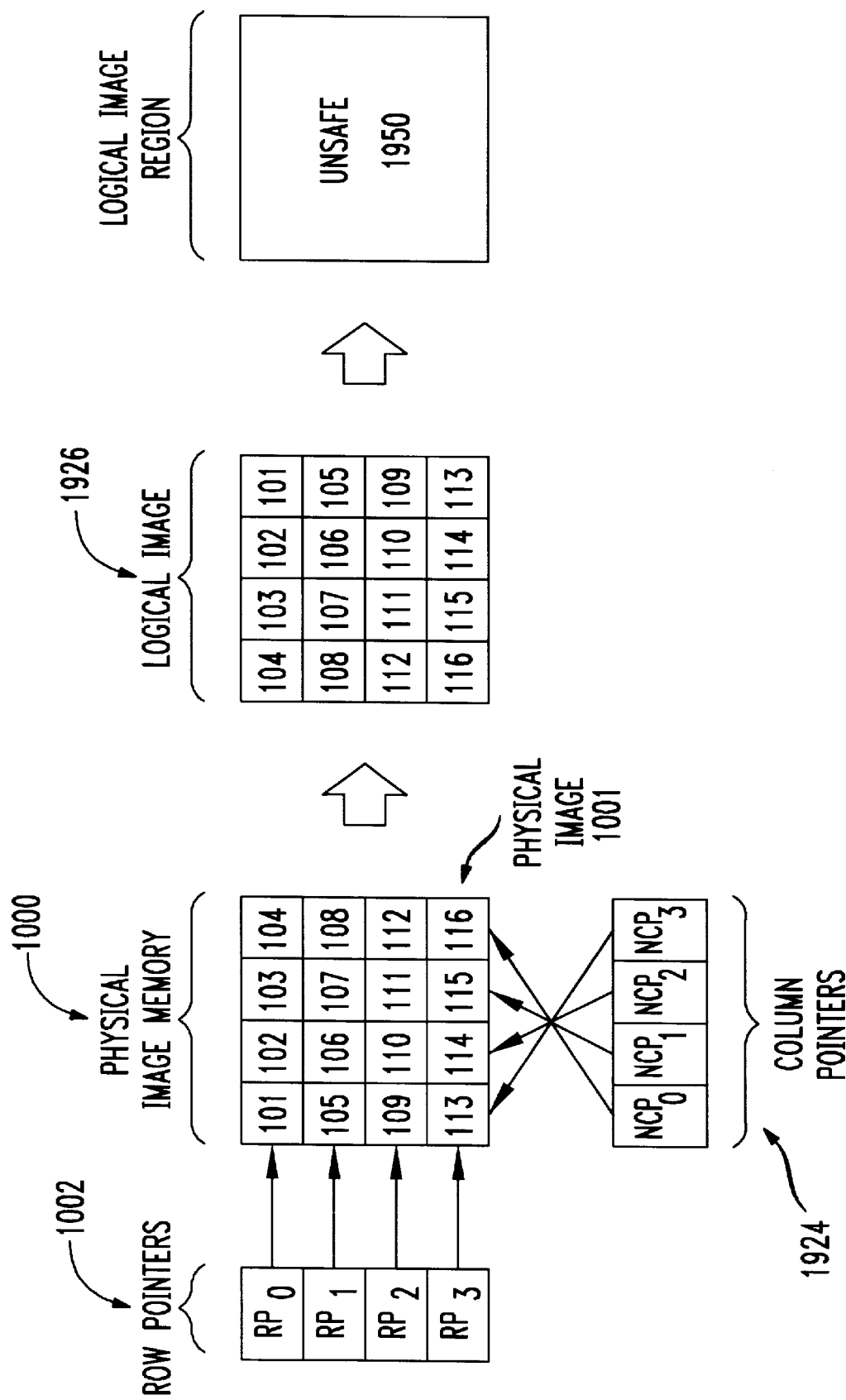

FIG. 19 illustrates an image processing operation involving flipping an image from top to bottom. This operation is achieved in accordance with the present invention as a virtual image processing operation by generating a new set of column pointers 1924 and then designating the entire logical image 1926 represented by the set of row pointers 1002 and new column pointers 1924 as corresponding to an unsafe image region 1950.

The image processing methods of the present invention can be implemented using programming techniques described in U.S. patent application Ser. No. 08/959,867 (now U.S. Pat. No. 5,905,894, issued May 18, 1999.) entitled "META PROGRAMMING METHODS AND APPARATUS" which is filed on even date herewith and which is hereby expressly incorporated by reference. Jeremy S. De Bonet who is an inventor of subject matter described herein is also the named inventor on the META PROGRAMMING METHODS AND APPARATUS patent application.

While the present invention has been illustrated with reference to exemplary embodiments, those skilled in the art will appreciate that various changes in form and detail may be made without departing from the intended scope of the present invention as defined in the appended claims. Because of the variations that can be applied to the illustrated and described embodiments of the invention, the invention should be defined with reference to the appended claims.

What is claimed is:

1. A method of processing image data representing an image, the method comprising the steps of:

storing the image data in a memory device including a plurality of memory locations;

generating a first set of row pointers and a first set of column pointers used to represent a first image, each row pointer in the first set of row pointers identifying a different one of said memory locations where data from a row of pixels is stored in the memory device, each column pointer identifying one of said memory locations where data from a column of pixels is stored in the memory device; and generating, to represent a second image, a second set of row pointers and a second set of column pointers, at least some of the second set of row pointers identifying the same memory locations as the first set of row pointers; and storing both the first and second sets of row pointers and the first and second sets of column pointers in the memory device, so that the memory device includes at least two sets of row and column pointers each of which include pointers to at least some of said memory locations used to store the image data; and wherein the memory locations defined by the second sets of row and column pointers collectively represent a virtual image, the virtual image corresponding to a region of the memory device which stores regularly-spaced image data.

2. The method of claim 1, further comprising the step of generating a new set of row pointers including a number of row pointers which is different from the number of row pointers included in the first set, to perform an image processing operation on the first image.

3. A method of processing data representing a first image, the method comprising the steps of:

storing the data representing the first image in a memory device;

generating a first set of row pointers, each row pointer identifying a location where data representing a row of pixels is stored in the memory device, wherein the first set of row pointers includes a first number of row pointers;

generating a first set of column pointers including a first number of column pointers, each column pointer identifying where data from a different column of pixels is stored in the memory device;

generating, to perform an image processing operation, a new set of column pointers from the first set of column pointers, the new set of column pointers including a different number of column pointers than the first set of column pointers; and generating, to perform the image processing operation, a new set of row pointers, the new set of row pointers including a second number of row pointers which is different from the first number of row pointers;

wherein the memory locations defined by the new set of row pointers and the new set of column pointers collectively represent a virtual image, the virtual image corresponding to a region of the memory device which stores regularly-spaced image data.

4. The method of claim 3, wherein the data stored in the memory locations pointed to by the new set of row and new set of column pointers represents a virtual image, the method further comprising the steps of:

designating a first portion of the virtual image corresponding to a region of memory where image data is regularly spaced as a safe logical image region; and designating a second portion of the virtual image corresponding to an irregularly spaced region in memory as an unsafe logical image region.

5. The method of claim 4, wherein a first memory access technique is used when accessing memory to retrieve data representing the safe logical image region of the virtual image and a second memory access technique when accessing memory to retrieve data representing the unsafe logical image region of the virtual image.

6. The method of claim 3, wherein the step of generating a new set of column pointers includes the step of generating more column pointers than the first number of column pointers.

7. The method of claim 6, wherein the image processing operation is an enlargement operation by a factor of M in the horizontal direction; and wherein the new set of column pointers includes M copies of each column pointer included in the first set of column pointers.

8. The method of claim 7, wherein the enlargement operation includes enlargement by a factor of N in the vertical direction, the method further comprising the step of:

generating a new set of row pointers from the first set of row pointers, the new set of row pointers including N copies of each of the row pointers in the first set of row pointers.

9. The method of claim 3, wherein the step of generating the new set of column pointers includes the step of generating fewer column pointers than the first number of column pointers such that the new set of column pointers includes fewer column pointers than the first set of column pointers.

10. The method of claim 9, wherein the image processing operation is an image reduction operation by a factor of M in the horizontal direction; and wherein the step of generating the new set of column pointers includes the step of generating a copy of one out of every M column pointers included in the first set of column pointers.

11. The method of claim 10, wherein the reduction operation includes reduction by a factor of N in the vertical direction, the method further comprising the step of:

generating a new set of row pointers including a copy of one out of every N row pointers included in the first set of row pointers.

12. The method of claim 11, wherein the stored data represents rows and columns of pixels, the method further comprising the step of:

setting a value in memory associated with the new set of row pointers indicating that the spacing between data representing pixels in a row is N times the spacing of the data in memory used to represent the pixels of the first image.

13. A computer-readable medium having computer executable instructions for performing the steps recited in claim 1.

14. A method of performing an image padding operation, comprising the steps of:

storing data representing N rows and M columns of pixels in NxM sequential segments of memory, where N and M are positive integers;

generating N row pointers, each one of the N row pointers identifying a position in memory where data corresponding to one of the N rows of pixels is located;

generating additional row pointers to form a set of augmented row pointers, each one of the additional row pointers pointing to a segment of memory where the data representing a first pixel of one of the N rows of pixels is stored.

15. The method of claim 14, further comprising the step of:

generating additional column pointers to form a set of augmented column pointers, each one of the additional column pointers representing an offset to be added to one of the additional row pointers to access a column pointed to by the additional column pointer.

16. The method of claim 15, wherein all the pointers in a set of N of the augmented row pointers points to a different segment of memory corresponding to the start of a different row, and wherein all the pointers in a set of M of the augmented column pointers indicates a different offset required to accesses data representing a different column of pixels, the method further comprising:

the step of designating a logical image region specified by the set of N row pointers and the set of M column pointers as a safe logical image region; and accessing the data representing each pixel of the safe logical image region by sequentially accessing memory segments pointed to by an address obtained by incrementing the row pointer which points to data representing the first pixel of the first row of the safe image region.

17. The method of claim 16, further comprising the step of:

designating image regions defined by row and column pointers not included in the set of N row pointers and M column pointers as being unsafe logical image regions; and accessing the data representing each pixel of the unsafe logical image regions using the row and column pointers.

18. Apparatus for processing image data representing an image, the apparatus comprising:

a processor; and a memory connected to the processor and storing computer executable instructions therein, the memory also storing the image data in a plurality of memory locations; and wherein the processor, in response to execution of the instructions:

generates a first set of row pointers and a first set of column pointers used to represent a first image, each row pointer in the first set of row pointers identifying a different one of said memory locations where data from a row of pixels is stored in the memory, each column pointer identifying one of said memory locations where data from a column of pixels is stored in the memory; and generates, to represent a second image, a second set of row pointers and a second set of column pointers, at least some of the second set of row pointers identifying the same memory locations as the first set of row pointers; and stores both the first and second sets of row pointers and the first and second sets of column pointers in the memory, so that the memory has at least two sets of row and column pointers each of which include pointers to at least some of said memory locations used to store the image data; and wherein the memory locations defined by the second set of row pointers and the second set of column pointers collectively represent a logical image, the logical image corresponding to a region of the memory which stores regularly-spaced image data.

19. The apparatus of claim 18, further comprising:

means for accessing the memory locations identified by the second set of row pointers and the second set of column pointers; and means for displaying the logical image.

20. The apparatus of claim 19, wherein the data representing different regions of the logical image correspond to different regions of the memory, the apparatus further comprising:

means for determining and storing information identifying which regions of the logical image correspond to regularly spaced memory regions so as to define safe logical image regions and which regions of the logical image correspond to irregularly spaced memory regions so as to define unsafe logical image-regions.

21. A computer-readable medium comprising computer executable instructions for:

storing image data in a memory including a plurality of memory locations;

generating a first set of row pointers and a first set of column pointers used to represent a first image, each row pointer in the first set of row pointers identifying a different one of said memory locations where data from a row of pixels is stored in the memory, each column pointer identifying one of said memory locations where data from a column of pixels is stored in the memory device; and generating, to represent a second image, a second set of row pointers and a second set of column pointers, at least some of the second set of row pointers identifying the same memory locations as the first set of row pointers; and storing both the first and second sets of row pointers and the first and second sets of column pointers in the memory, so that the memory includes at least two sets of row and column pointers each of which include pointers to at least some of said memory locations used to store the image data; and wherein the memory locations defined by the second sets of row and column pointers collectively represent a virtual image, the virtual image corresponding to a region of the memory which stores regularly-spaced image data.

* * * * *

UNITED STATES PATENT AND TRADEMARK OFFICE
CERTIFICATE OF CORRECTION

PATENT NO.    : 6,075,545
DATED         : June 13, 2000
INVENTOR(S)   : Jeremy S. DeBonet, Richard Szeliski It is certified that error appears in the above-identified patent and that said Letters Patent is hereby corrected as shown below:

Column 6,
Line 33, change "FIGS. 18, 19 and 20" to -- FIGS. 18 and 19 --; and

Column 17,
Line 55, change "++" to -- + --.

Signed and Sealed this

Ninth Day of October, 2001

Attest:

NICHOLAS P. GODICI
Attesting Officer   Acting Director of the United States Patent and Trademark Office